US010416667B2

United States Patent
Berestov et al.

(10) Patent No.: US 10,416,667 B2
(45) Date of Patent: Sep. 17, 2019

(54) SYSTEM AND METHOD FOR UTILIZATION OF MULTIPLE-CAMERA NETWORK TO CAPTURE STATIC AND/OR MOTION SCENES

(71) Applicant: SONY CORPORATION, Tokyo (JP)

(72) Inventors: Alexander Berestov, San Jose, CA (US); Ming-Chang Liu, San Jose, CA (US); Chuen-Chien Lee, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 182 days.

(21) Appl. No.: 15/014,743

(22) Filed: Feb. 3, 2016

(65) Prior Publication Data
US 2017/0220037 A1    Aug. 3, 2017

(51) Int. Cl.
*G05D 1/00*        (2006.01)
*G05D 1/10*        (2006.01)
(Continued)

(52) U.S. Cl.
CPC ......... *G05D 1/0027* (2013.01); *B64C 39/024* (2013.01); *G05D 1/0094* (2013.01); *G05D 1/104* (2013.01); *G06K 9/0063* (2013.01); *G06T 15/205* (2013.01); *G06T 17/00* (2013.01); *H04N 5/23203* (2013.01); *H04N 5/247* (2013.01); *B64C 2201/027* (2013.01);
(Continued)

(58) Field of Classification Search
None
See application file for complete search history.

(56) References Cited

U.S. PATENT DOCUMENTS 6,130,705 A * 10/2000 Lareau ............... G01C 3/08
                                                    348/144
9,026,272 B2 * 5/2015 Kokkeby ............ G01S 3/7864
                                                    701/3
(Continued)

OTHER PUBLICATIONS

M. Quartish et al., "Networked UAVS as Aerial Sensor Network for Disaster Management Applications", Jan. 2010, pp. 56-63, vol. 127, Issue 3, E & I Elektrotechnik und Informationstechnik, DOI: 10.1007/s00502-010-0717-2, ISSN: 0932-383X, Springer Verlag.
(Continued)

*Primary Examiner* — Kate H Luo
(74) *Attorney, Agent, or Firm* — Chip Law Group

(57) ABSTRACT

Various aspects of a system and method for utilization of multiple-camera network to capture static and/or motion scenes are disclosed herein. The system comprises a plurality of unmanned aerial vehicles (UAVs). Each of the plurality of UAVs is associated with an imaging device configured to capture a plurality of images. A first UAV of the plurality of UAVs comprises a first imaging device configured to capture a first set of images of one or more static and/or moving objects. The first UAV is configured to receive focal lens information, current location and current orientation from one or more imaging devices. A target location and a target orientation of each of the one or more imaging devices are determined. Control information is communicated to the one or more other UAVs to modify the current location and current orientation to the determined target location and orientation of each of the one or more imaging devices.

32 Claims, 15 Drawing Sheets

(51) Int. Cl.

| | | |
|---|---|---|
| *G06K 9/00* | (2006.01) | |
| *B64C 39/02* | (2006.01) | |
| *G06T 15/20* | (2011.01) | |
| *G06T 17/00* | (2006.01) | |
| *H04N 5/232* | (2006.01) | |
| *H04N 5/247* | (2006.01) | |

(52) U.S. Cl.
CPC .. *B64C 2201/127* (2013.01); *B64C 2201/143* (2013.01); *B64C 2201/146* (2013.01)

(56) References Cited

U.S. PATENT DOCUMENTS

| 9,769,387 B1* | 9/2017 | Beard ................. G06K 9/0063 |
|---|---|---|
| 2009/0021423 A1* | 1/2009 | Cheng .................... G01S 7/003 |
| | | 342/25 A |
| 2013/0162822 A1* | 6/2013 | Lee ....................... H04N 7/185 |
| | | 348/146 |
| 2014/0240498 A1 | 8/2014 | Ohtomo et al. |
| 2014/0249693 A1* | 9/2014 | Stark .................... B64C 39/024 |
| | | 701/2 |
| 2014/0316616 A1* | 10/2014 | Kugelmass ............ G05D 1/101 |
| | | 701/8 |
| 2014/0336848 A1* | 11/2014 | Saund ................... G08G 1/054 |
| | | 701/3 |
| 2015/0063202 A1 | 3/2015 | Mazzarella et al. |
| 2015/0120126 A1* | 4/2015 | So ......................... G01C 23/00 |
| | | 701/26 |
| 2015/0134143 A1* | 5/2015 | Willenborg .......... G05D 1/0094 |
| | | 701/2 |
| 2015/0145954 A1* | 5/2015 | Pulleti .................... B64C 39/02 |
| | | 348/46 |
| 2015/0248584 A1* | 9/2015 | Greveson ........... G06K 9/00476 |
| | | 382/113 |
| 2015/0341540 A1* | 11/2015 | Kim .................... H04N 5/23203 |
| | | 348/144 |
| 2015/0350614 A1* | 12/2015 | Meier .................... H04N 7/188 |
| | | 348/144 |
| 2015/0362917 A1* | 12/2015 | Wang .................. G05D 1/0022 |
| | | 701/2 |
| 2016/0370263 A1* | 12/2016 | Duesterhoft .......... B64C 39/024 |

OTHER PUBLICATIONS

Stephen Cameron et al., "Suaave: Combining Aerial Robots and Wireless Networking", Feb. 2010, pp. 14, University of Oxford, UK.

Extended European Search Report of EP Patent Application No. 17747953.2, dated Jul. 16, 2019, 9 pages.

Ding, et al., "Coordinated Sensing and Tracking for Mobile Camera Platforms", 2012 American Control Conference (ACC), Fairmont Queen Elizabeth, Montreal, Canada, Jun. 27-29, 2012, pp. 5114-5119.

Lyu, et al., "Simultaneously Multi-Uav Mapping and Control with Visual Servoing", 2015 International Conference on Unmanned Aircraft Systems (ICUAS), Denver, Colorado, USA, Jun. 9-12, 2015, pp. 125-131.

* cited by examiner

SYSTEM AND METHOD FOR UTILIZATION OF MULTIPLE-CAMERA NETWORK TO CAPTURE STATIC AND/OR MOTION SCENES

FIELD

Various embodiments of the disclosure relate to capturing of static and/or motion scenes. More specifically, various embodiments of the disclosure relate to utilization of a multiple-camera network to capture static and/or motion scenes.

BACKGROUND

Since the inception and subsequent development of digital cameras and low cost sensor systems, the technology has now advanced toward multiple-camera network systems. Such multiple-camera network systems may be used for various applications, such as smart homes, office automation, media and entertainment, security and surveillance, mobile and robotic networks, human-computer interfaces, virtual reality systems, 3D object reconstruction, and/or motion capture.

Typically, a user terminal, which is communicatively connected to the multiple-camera network system and a centralized image processing server, may receive a user input to select one or more objects in a facility, such as a sports stadium. The multiple-camera network system may include multiple stationary cameras, such as off-the-shelf cameras, embedded cameras, and/or communicatively coupled cameras. The multiple stationary cameras may be installed around the facility at different angles and strategic locations to capture a real-time 360° motion of the selected one or more objects in the facility. Such multiple stationary cameras installed around the facility, may be calibrated by the centralized image processing server. The calibration may be performed by the centralized image processing server to resolve part-to-part variations, focal lens difference, and lens distortion of the multiple stationary cameras.

The centralized image processing server may receive the user input and communicate control commands to the multiple-camera network system. The control commands may be based on the selection of the one or more objects and one or more ambient factors (such as lighting, shadows, and/or reflections). The control commands may adjust one or more parameters of the stationary cameras in the multiple-camera network system. Accordingly, the multiple-camera network system may capture multiple images, based on the control commands. The captured images may be transmitted back to the centralized image processing server.

The centralized image processing server may process the received captured images and transmit the processed images to the user terminal for display and analysis thereof. However, in certain instances, the placement of the stationary cameras in the multiple-camera network system may not be suitable enough to provide a sufficient coverage of a predefined area that includes the selected one or more objects. Hence, it may be desirable that the multiple-camera network system includes non-stationary cameras for optimal placement in the facility for maximal coverage of the predefined area at a specific resolution, based on objectives of the various applications. It may be further desirable that the centralized image processing server is robust enough to take minimal time for an accurate calibration.

Further limitations and disadvantages of conventional and traditional approaches will become apparent to one of skill in the art, through comparison of described systems with some aspects of the present disclosure, as set forth in the remainder of the present application with reference to the drawings.

SUMMARY

A system and method for image processing by use of a plurality of imaging devices substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
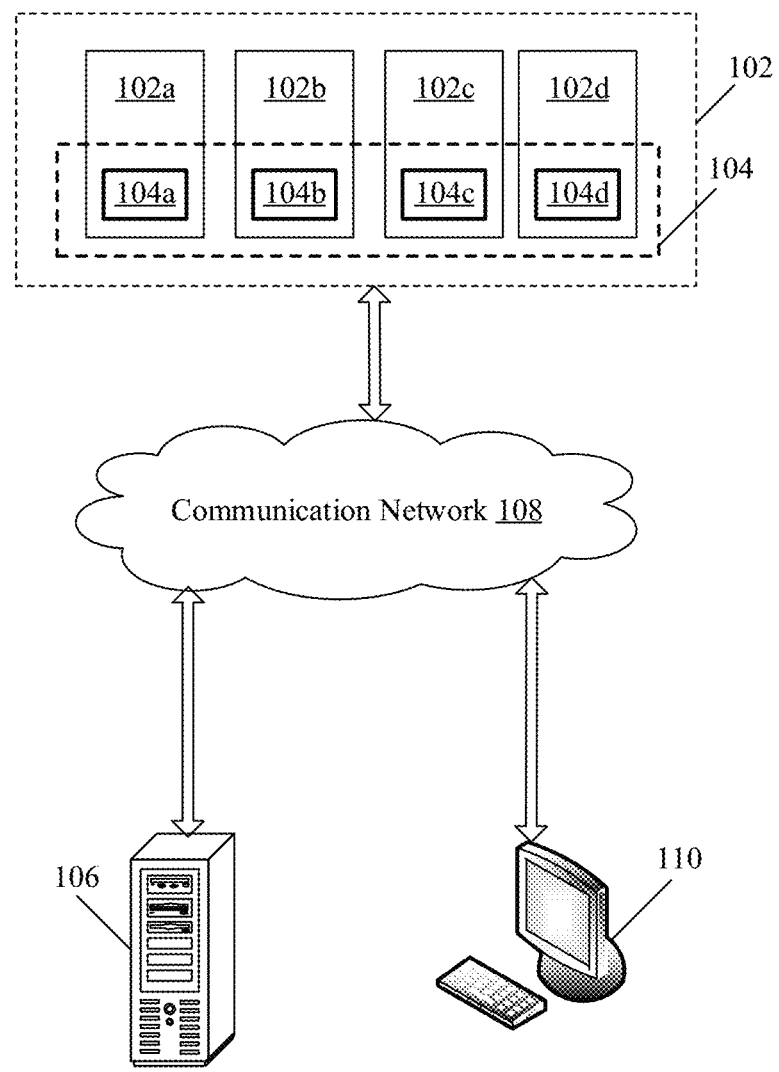
FIG. 1 is a block diagram that illustrates a network environment, in accordance with an embodiment of the disclosure.

The following described implementations may be found in a system and method for image processing by use of a plurality of imaging devices. Exemplary aspects of the disclosure may comprise a method implemented in a first unmanned aerial vehicle (UAV) in a network that further includes one or more other UAVs. Each of the plurality of UAVs (that includes the first UAV and the one or more other UAVs) may be associated with an imaging device configured to capture a plurality of images. A first UAV of the plurality of UAVs may comprise a first imaging device configured to capture a first set of images of one or more static and/or moving objects.

The method may include receipt of focal lens information, current location, and current orientation of the one or more imaging devices from one or more imaging devices. The one or more imaging devices may be associated with one or more other UAVs of the plurality of UAVs. A target location and a target orientation of the one or more imaging devices may be determined, based on the received focal lens information, the received current location, the received current orientation and a current location of the one or more static and/or moving objects. Control information may be communicated to the one or more other UAVs to modify the current location and the current orientation of the one or more imaging devices. The current location and the current orientation may be modified to the determined target location and the determined target orientation of the one or more imaging devices. In accordance with an embodiment, the communicated control information may further comprise capture information. The capture information may enable the one or more imaging devices to capture a set of images of the one or more static and/or moving objects at the determined target location and the determined target orientation. The method may further include reconstruction of a three dimensional (3D) structure from the captured first set of images and the captured second set of images.

In accordance with an embodiment, the method may include dynamic synchronization of the captured first set of images and the captured second set of images to reconstruct the 3D structure. In accordance with an embodiment, the method may include communication of calibration information to the one or more other UAVs. The calibration information may be communicated to enable calibration of the one or more imaging devices, based on the received focal lens information and a plurality of images of a pre-determined calibration object. In accordance with an embodiment, the calibration of the one or more imaging devices may be performed to adjust one or more intrinsic and/or extrinsic parameters of the one or more imaging devices.

In accordance with another aspect of the disclosure, another method to perform image processing by use of a plurality of imaging devices is disclosed. The method may be implemented in a server that is communicatively coupled with a plurality of UAVs for image processing. The plurality of UAVs may be associated with one or more imaging devices configured to capture a plurality of images. The method may include receipt of focal lens information, current location, and current orientation of the one or more imaging devices, from the one or more imaging devices associated with the plurality of UAVs. The method may further include determination of a target location and a target orientation of the one or more imaging devices. The determination may be based on the received focal lens information, the received current location, the received current orientation, and a current location of one or more static and/or moving objects to be captured. Control information may be communicated to the plurality of UAVs to modify the current location and the current orientation of the one or more imaging devices. The current location and the current orientation may be modified to the determined target location and the determined target orientation of the one or more imaging devices.

In accordance with an embodiment, the communicated control information may further comprise capture information. The capture information may enable the one or more imaging devices to capture a set of images of the one or more static and/or moving objects at the determined target location and the determined target orientation. In accordance with an embodiment, the method may further include reconstruction of a three dimensional (3D) structure from the captured set of images. In accordance with an embodiment, the method may include dynamic synchronization of the captured set of images to reconstruct the 3D structure.

In accordance with an embodiment, the method may include communication of calibration information to the plurality of UAVs. The communication of the calibration information may enable calibration of the one or more imaging devices based on the received focal lens information and a plurality of images of a pre-determined calibration object.

In accordance with another aspect of the disclosure, another method to perform image processing by use of a plurality of imaging devices is disclosed. The method may be implemented in a system that includes a first network and a second network. The first network may include a first set of UAVs and the second network may include a second set of UAVs. Each of the first set of UAVs and the second set of UAVs may be associated with an imaging device that may be configured to capture a plurality of images. The method may be implemented in a first UAV of the first set of UAVs. The first UAV may comprise a first imaging device that may be configured to capture a first set of images of one or more static and/or moving objects. The method may include receipt of the first set of UAVs, focal lens information, current location and current orientation of the first set of imaging devices, from a first set of imaging devices associated with the first set of UAVs. The method may further include determination of a target location and a target orientation of the first set of imaging devices, based on the received focal lens information, the received current location, the received current orientation and a current location of the one or more static and/or moving objects. Control information may be communicated to the first set of UAVs to modify the current location and the current orientation of the first set of imaging devices. The current location and the current orientation may be modified to the determined target location and the determined target orientation of the first set of imaging devices. In accordance with an embodiment, the communicated control information by the first UAV may further comprise capture information by the first set of imaging devices at the determined target location and the determined target orientation. The capture information may enable capture of the first set of images of the one or more static and/or moving objects.

In accordance with an embodiment, a second UAV of the second set of UAVs may comprise a second imaging device configured to capture a second set of images of the one or more static and/or moving objects. The method, implemented in the second UAV, may receive, from a second set of imaging devices associated with the second set of UAVs, focal lens information, current location and current orientation of the second set of imaging devices. In accordance with an embodiment, the method may include determination of a target location and a target orientation of the second set of imaging devices. The determination may be based on the received focal lens information, the received current location, the received current orientation and the current location of the one or more static and/or moving objects. Control information may be communicated to the second set of UAVs to modify the current location and the current orientation of the second set of imaging devices. The current location and the current orientation may be modified to the determined target location and the determined target orientation of the second set of imaging devices. In accordance with an embodiment, the communicated control information by the second UAV further comprises capture information by the second set of imaging devices at the determined target location and the determined target orientation. The capture information may enable capture of a second set of images of the one or more static and/or moving objects. In accordance with an embodiment, the method may include dynamic synchronization of the captured first set of images and the captured second set of images to reconstruct the 3D structure of the one or more static and/or moving objects.

FIG. 1 is a block diagram that illustrates a network environment, in accordance with an embodiment of the disclosure. With reference to FIG. 1, there is shown a network environment 100 that includes a plurality of UAVs 102, a plurality of imaging devices 104, a server 106, a communication network 108, and a user terminal 110. The plurality of UAVs 102 may include two or more UAVs, such as a first UAV 102a, a second UAV 102b, a third UAV 102c, and a fourth UAV 102d. The plurality of imaging devices 104 may include two or more imaging devices, such as a first imaging device 104a, a second imaging device 104b, a third imaging device 104c, and a fourth imaging device 104d. The first UAV 102a, the second UAV 102b, the third UAV 102c, and the fourth UAV 102d may be associated with the first imaging device 104a, the second imaging device 104b, the third imaging device 104c, and the fourth imaging device 104d, respectively. The plurality of UAVs 102, the plurality of imaging devices 104, the server 106, and the user terminal 110, may be configured to communicate with each other, via the communication network 108.

The plurality of UAVs 102 may comprise suitable logic, circuitry, interfaces, and/or code that may correspond to unmanned aerial vehicles or systems, controlled by a remote system or capable of autonomous flights. The unmanned aerial vehicles or systems may be controlled by a remote pilot at a ground control station. The unmanned aerial vehicles or systems may also fly autonomously, based on various pre-programmed flight plans or complex dynamic automation systems. The plurality of UAVs 102 may be configured to communicate with each other during the flight, via the communication network 108. The arrangement of the plurality of UAVs 102 may be based on a dynamically determined processing mode. Examples of the plurality of UAVs 102 may include, but are not limited to, a drone, a smartplane, or other such aircraft either without a pilot aboard or controlled by pre-programmed flight plans and/or automation systems. In accordance with a frame type and number of motors, various examples of the plurality of UAVs 102 may include, but not limited to, a tricopter with three arms and one motor, a quadcopter with four arms and one motor, a hexacopter with six arms and one motor, a Y6 copter with six arms and six motors, an octocopter with eight arms and one motor, and/or an X8 with eight arms and eight motors.

The plurality of imaging devices 104 may comprise suitable logic, circuitry, interfaces, and/or code that may be configured to capture multiple images and/or video frames within a field-of-view (FOV) of the corresponding UAV. The plurality of imaging devices 104 may further generate visual representations of the captured one or more images and/or video frames. The plurality of imaging devices 104 may include a lens assembly and an image sensor that may enable the plurality of imaging devices 104 to capture the one or more images and/or video frames. The image sensor of the plurality of imaging devices 104 may be implemented by use of a charge-coupled device (CCD) technology, complementary metal-oxide-semiconductor (CMOS) technology and/or the like. Examples of the plurality of imaging devices 104 may correspond to, but are not limited to, a compact camera, a bridge circuit camera, a camcorder, a digital camera, a point-of-view (POV) camera, a thermographic camera, a single lens reflex camera or/and an onboard camera.

The server 106 may comprise suitable logic, circuitry, interfaces, and/or code that may be configured to receive the multiple images and/or video frames captured by the plurality of imaging devices 104, via the communication network 108. In accordance with an embodiment, the server 106 may perform image processing for 3D reconstruction of the received multiple images and/or video frames. Examples of the server 106 may include, but are not limited to, a database server, a web server, a file server, a media server, a proxy server, and/or a communication server.

The communication network 108 may include a medium through which the plurality of UAVs 102 may be communicatively connected with the server 106 and the user terminal 110. Examples of the communication network 108 may include, but are not limited to, the Internet, a cloud network, a Wireless Fidelity (Wi-Fi) network, a Wireless Local Area Network (WLAN), a Local Area Network (LAN), a telephone line (POTS), wireless WAN and/or a Metropolitan Area Network (MAN). Various devices in the network environment 100 may be operable to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, wireless mesh network (WMN), infrared (IR), IEEE 802.11, 802.16, IEEE 802.11s, IEEE 802.11g, multi-hop communication, UVNet, flying ad-hoc network (FANET), wireless access point (AP), device to device communication, cellular communication protocols, and/or Bluetooth (BT) communication protocols.

The user terminal 110 may comprise suitable logic, circuitry, interfaces, and/or code that may be configured to receive a user input and communicate the received user input to the plurality of UAVs 102 and/or the server 106. Examples of the user terminal 110 may include, but are not limited to, a smartphone, a camera, a tablet computer, a laptop, a wearable electronic device, a television, an Internet Protocol Television (IPTV), and/or other such display terminal.

In operation, each of the plurality of UAVs 102 may perform a pre-flight diagnostic process to monitor system controls and state variables associated with the plurality of UAVs 102. Examples of such system controls may include, but are not limited to, flight and other control variables, wireless communication links, sensor units, battery level, central processing units, and other hardware components, such as helicopter rotators. Examples of the state variables that correspond to various computational resources of corresponding plurality of UAVs 102 may include, but are not limited to, computational bandwidth and/or memory availability, and/or battery level. Once the pre-flight diagnostic process is successful, the plurality of UAVs 102 may initiate the flight and become air-borne. Thereafter, the plurality of UAVs 102, which is now air-borne, may perform in-flight diagnostic process to periodically monitor respective system controls and state variables.

In accordance with an embodiment, the plurality of UAVs 102 may be configured to communicate with each other, via the communication network 108 (such as Wi-Fi), in accordance with a pre-programmed flight plan. In accordance with a particular instance, the plurality of UAVs 102 may create a mesh network in which each UAV is enabled to communicate with other UAV, based on various wireless protocols known in the art. In accordance with an embodiment, the mesh network may further include the server 106, in addition to the plurality of UAVs 102. In accordance with another instance, the plurality of UAVs 102 may create an ad-hoc network to enable such wireless communication, based on various wireless protocols known in the art.

In accordance with an embodiment, one of the plurality of UAVs 102 and/or the server 106 may be further configured to centrally monitor system controls and state variables of the plurality of UAVs 102 and/or the server 106. In accordance with an example, the first UAV 102a may be configured to monitor and record system controls and state variables of the plurality of UAVs 102 and/or the server 106. In accordance with an example, the server 106 may be configured to monitor and record system controls and state variables of the plurality of UAVs 102 and/or the server 106. Accordingly, the one of the plurality of UAVs 102 and/or the server 106 may be further configured to generate a state variable table that may store and periodically update the state variables of the plurality of UAVs 102 and/or the server 106. Such one of the plurality of UAVs 102 and/or the server 106 may be pre-configured and/or pre-programmed to be a master device to monitor the plurality of UAVs 102 and/or the server 106.

In accordance with an embodiment, the user terminal 110 may be configured to receive a user input from a user associated with the user terminal 110, via an I/O device (such as a touch screen). The received user input may include a selection of one or more static and/or moving objects. The selection may be performed by the user, via the I/O device. In an exemplary scenario, the user may be a sports commentator who may want to analyze a specific shot played by a player in motion. Accordingly, the user may provide a touch input at the display screen to select the player in motion.

In accordance with a first aspect of the disclosure, the user terminal 110 may be configured to communicate the received user input to one of the plurality of UAVs 102, such as the first UAV 102a. A person ordinary skilled in the art will understand that the communication of the user input to the first UAV 102a has been described for exemplary purpose, which may not be construed to limit the disclosure. It may be assumed in this example, that the first UAV 102a may be pre-configured and/or pre-programmed to be a master device (due to sufficiency of computational resources) to monitor the plurality of UAVs 102 and/or the server 106. Notwithstanding, the disclosure may not be limited to the configuration of the first UAV 102a to be pre-programmed as a master device or a controller. Others of the plurality of UAVs 102 with sufficient computational resources may also be configured or programmed as the master device, without deviation from the scope of the disclosure.

In accordance with an embodiment, the first UAV 102a of the plurality of UAVs 102 may be associated with the first imaging device 104a. The first imaging device 104a may be configured to capture a first set of images. Similarly, the one or more other UAVs 102b to 102d, may be associated with the respective one or more other imaging devices 104b to 104d. The one or more other imaging devices 104b to 104d may be configured to capture a second set of images. In accordance with an embodiment, based on the user input, the first UAV 102a may be configured to receive information from the one or more other UAVs 102b to 102d. In such a case, the plurality of UAVs 102 and the server 106 may be in a mesh network, via a wireless communication channel, such as Wi-Fi. The information may comprise focal lens information, current location and current orientation of the one or more imaging devices 104b to 104d associated with the one or more other UAVs 102b to 102d. The information may be determined by the one or more other UAVs 102b to 102d, based on a first set of sensors, such as gyroscopes, installed therein. The information may be refined by the one or more other UAVs 102b to 102d, based on a second set of sensors, such as image sensors, installed therein. The first UAV 102a may be further configured to determine a current location of the selected one or more static or moving objects in the received user input.

In accordance with an embodiment, the first UAV 102a may be configured to determine calibration information of the one or more other UAVs 102b to 102d, based on the received focal lens information and a plurality of images of a common pre-determined calibration object, such as a checkerboard. The plurality of images of the pre-determined calibration object may be captured by the plurality of imaging devices 104 from one or more angles and directions. The first UAV 102a may be configured to communicate the determined calibration information to the one or more imaging devices 104b to 104d, associated with the one or more other UAVs 102b to 102d. Accordingly, calibration of the one or more imaging devices 104b to 104d, may be performed by the respective one or more other UAVs 102b to 102d.

The calibration of the one or more imaging devices 104b to 104d may be performed by the one or more other UAVs 102b to 102d to adjust one or more intrinsic and/or extrinsic parameters of the one or more imaging devices 104b to 104d. The intrinsic parameters may correspond to one or more parameters required to link pixel coordinates of an image point with corresponding coordinates in the reference frame of an imaging device. Examples of the intrinsic parameters may include, but are not limited to, focal length, image sensor format, principal point, and/or lens distortion. The extrinsic parameters may correspond to one or more parameters that define location and orientation of the reference frame of the imaging device with respect to a known world reference frame. Examples of the extrinsic parameters may include, but are not limited to, coordinate system transformations from 3D world coordinates to 3D camera coordinates.

In accordance with an embodiment, the first UAV 102a may be configured to determine a target location and a target orientation of the one or more imaging devices 104b to 104d. The target location and a target orientation may be determined based on the received focal lens information, the received current location, the received current orientation, and the current location of the selected one or more static or moving objects. The first UAV 102a may be configured to determine its target location and target orientation, in accordance with a triangulation technique, as explained in FIGS. 5A to 5D. A person with ordinary skill in the art will understand that the target locations and the target orientations of the plurality of imaging devices 104 may correspond to an optimal arrangement of the plurality of imaging devices 104 around the selected one or more static or moving objects. The optimal arrangement of the plurality of UAVs 102 corresponds to maximal coverage of a 3D scene structure that includes the selected one or more static or moving objects at a pre-determined resolution of the plurality of imaging devices 104.

In accordance with an embodiment, the first UAV 102a may be configured to communicate control information to the one or more other UAVs 102b to 102d. Based on the received control information, the one or more other UAVs 102b to 102d may modify the current location and the current orientation of the one or more imaging devices 104b to 104d. The current location and the current orientation of the one or more imaging devices 104b to 104d may be modified to the determined target location and the determined target orientation. In accordance with an embodiment, the first UAV 102a may be configured to modify its current location and the current orientation to the target location and the target orientation, determined via the triangulation technique.

Once the plurality of UAVs 102 modify their current locations and the current orientations to the target locations and target orientations, the plurality of imaging devices 104 may capture a set of images of the one or more static or moving objects. The set of images may include a first set of images captured by the first imaging device 104a of the first UAV 102a. The second set of images may be captured by the one or more imaging devices 104b to 104d of the one or more other UAVs 102b to 102d, respectively. The first set of images may be dynamically synchronized with the second set of images, based on synchronization signals transmitted by the first UAV 102a. The synchronization signal may establish a timing correlation between the plurality of imaging devices 104 so that the first set of images and the second set of images exhibit a time-lapse of minimal time in real-time.

The plurality of imaging devices 104 may be further configured to collaboratively capture motion information associated with the selected one or more static and/or moving objects. In accordance with an embodiment, the motion information may be collaboratively captured by the plurality of imaging devices 104, based on one or more spherical positions of the one or more static and/or moving objects with marker information, known in the art. For example, the marker information may be indicated by one or more colored blobs for various bony segments that may be continuously tracked by the plurality of UAVs 102. In accordance with an embodiment, the motion information may be collaboratively captured by the plurality of imaging devices 104, based on one or more spherical positions of the one or more static and/or moving objects without marker information, known in the art. For example, a marker-less object tracking algorithm may be implemented in the plurality of UAVs 102 that may estimate detections of body parts of the one or more static and/or moving objects estimated from a ConvNet-based joint detection algorithm (known in the art). The marker-less object tracking algorithm may further fuse the body parts detections into a generative model-based tracking algorithm, based on the Sums of Gaussians framework, known in the art. A person ordinary skilled in the art may understand that the above examples are merely for illustrative purposes, and may not be construed to limit the scope of the disclosure.

The first UAV 102a may be further configured to dynamically determine a processing mode, based on which the set of images captured by the plurality of imaging devices 104 may be processed. The processing mode may correspond to a distributed processing mode, centralized processing mode, or a clustered processing mode. The first UAV 102a may dynamically determine the processing mode, based on the state of the computational resources retrieved from the state variable table, updated during the latest in-flight diagnostic process. The computational resources may correspond to the computational bandwidth, the memory availability, and/or the battery level of the plurality of the UAVs 102 and the server 106. Accordingly, the first UAV 102a may select one of the plurality of UAVs 102 or the server 106, to process the set of images in the most optimal manner.

In accordance with an embodiment, based on the state of the computational resources, the first UAV 102a may determine that the first UAV 102a itself exhibits maximum computational bandwidth, the memory availability, and/or the battery level out of the plurality of UAVs 102 and the server 106. In such a case, the first UAV 102a may be configured to perform a real-time reconstruction of 3D structure of the selected one or more static and/or moving objects, based on the first and the second set of images. Such real-time 3D structure reconstruction may be performed by the first UAV 102a, in accordance with a first application. Notwithstanding, the disclosure may not be so limited, and another 3D structure reconstruction may be performed in accordance with another application and different target locations and target orientations of the plurality of UAVs, without deviation from the scope of the disclosure.

The reconstruction of the 3D structure may be performed by the first UAV 102a, based on 3D scene interpretation and/or point cloud generation for the selected one or more static and/or moving objects. The 3D scene interpretation and/or point cloud generation for the selected one or more static or moving objects may be performed, based on the target locations and target orientations of the plurality of UAVs 102 from where the set of images is captured.

In accordance with an embodiment, the first UAV 102a may be further configured to communicate the reconstructed 3D structure to the user terminal 110, via the communication network 108. Thus, in such a case, the user terminal 110 may receive the reconstructed 3D structure for display. In accordance with an embodiment, the user terminal 110 may be further operable to receive another user input to modify the viewpoint of the 3D reconstructed image. A request that corresponds to the modified viewpoint may be communicated back to the first UAV 102a. Based on the request, the first UAV 102a may again determine a new target location and target orientation of the one or more other UAVs 102b to 102d, respectively. The first UAV 102a may receive a new set of images from the one or more other UAVs 102b to 102d UAVs, in a similar manner as described above. Reconstruction of the 3D structure may be again performed, and communicated to the user terminal 110, via the communication network 108, in a similar manner as described above.

In accordance with an embodiment, based on the state of the computational resources, the first UAV 102a may determine that the server 106 exhibits maximum computational bandwidth, memory availability, and/or battery level out of the plurality of UAVs 102 and the server 106. In such a case, the first UAV 102a may be configured to communicate the captured first set of images and the received second set of images to the server 106. The server 106 may be further configured to perform a real-time reconstruction of 3D structure of the selected one or more static or moving objects, based on the received first and the second set of images. Such real-time 3D structure reconstruction may be performed by the server 106, in accordance with a first application. A person with ordinary skill in the art may understand that the above-mentioned 3D structure reconstruction is performed in accordance with the first application for illustrative purpose. Notwithstanding, the disclosure may not be so limited, and another 3D structure reconstruction may be performed in accordance with another application and different target locations and target orientations of the plurality of UAVs, without deviation from the scope of the disclosure.

In accordance with an embodiment, based on the state of the computational resources, the first UAV 102a may determine that both the first UAV 102a and the third UAV 102c exhibit maximum computational bandwidth, memory availability, and/or battery level out of the plurality of UAVs 102 and the server 106. In such a case, the first UAV 102a and the third UAV 102c may be configured to identify a first and a second set of UAVs, respectively, based on one or more criteria, such as physical proximity and/or corresponding values of state variables. The first UAV 102a and the third UAV 102c may be further configured to determine which of the one or more other UAVs 102b and 102d, may be included in the first and the second set of UAVs. For example, the first UAV 102a may identify that the second UAV 102b may be included in the first set of UAVs. The second UAV 102b may be identified to be nearest to the first UAV 102a with limited computational resources, such as insufficient memory availability. Thus, a first network may be established that includes the first UAV 102a and the second UAV 102b. The first network may be also referred to as a first cluster. Similarly, the third UAV 102c may identify that the fourth UAV 102d may be included in the second set of UAVs. The fourth UAV 102d may be identified to be the nearest to the third UAV 102c and has limited resources, such as marginal battery level. Thus, a second network may be established that includes the third UAV 102c and the fourth UAV 102d. The second network may be also referred to as a second cluster.

In such a case, the second UAV 102b may communicate the captured set of images to the first UAV 102a. The set of images captured by the first UAV 102a and the second UAV 102b in the first cluster may be collectively referred to as a first set of images. Similarly, the fourth UAV 102d communicates the captured set of images to the third UAV 102c. The set of images captured by the third UAV 102c and the fourth UAV 102d in the second cluster may be collectively referred to as a second set of images.

The first UAV 102a and the third UAV 102c may be further configured to perform a real-time reconstruction of 3D structure of the selected one or more static and/or moving objects, based on the first set of images and the second set of images, respectively. Such real-time 3D structure reconstruction may be performed by the first UAV 102a and the third UAV 102c, in accordance with a first application. A person with ordinary skill in the art may understand that the above-mentioned 3D structure reconstruction is performed in accordance with the first application for illustrative purpose. Notwithstanding, the disclosure may not be so limited, and another 3D structure reconstruction may be performed in accordance with another application and different target locations and target orientations of the plurality of UAVs, without deviation from the scope of the disclosure.

The reconstruction of the two 3D structures may be performed by the first UAV 102a and the third UAV 102c, based on 3D scene interpretation and/or point cloud generation for the selected one or more static or moving objects. The 3D scene interpretation and/or point cloud generation for the selected one or more static and/or moving objects may be performed, based on the target locations and target orientations of the plurality of UAVs 102 from where the set of images is captured.

In accordance with an embodiment, the first UAV 102a and the third UAV 102c may be further configured to communicate the reconstructed 3D structures from the first set of images and the second set of images to the user terminal 110, via the communication network 108. Thus, in such a case, the user terminal 110 may receive the two reconstructed 3D structures for display. Based on the state control variables that indicate availability of the computational resources, one of the master UAVs, such as the first UAV 102a and the third UAV 102c, may be selected to perform a final reconstruction of a 3D structure. The final reconstruction may be performed at the user terminal 110 to generate a single 3D structure, which may be communicated to the user terminal 110.

In accordance with an embodiment, based on the latest values of the state variables, the first UAV 102a may determine that the first UAV 102a and the third UAV 102c now exhibit limited resources and the server 106 exhibits available resources. In such a case, the first UAV 102a and the third UAV 102c may transmit the two 3D reconstructed images to the server 106 for a further reconstruction of a final 3D structure. The server 106 may be further configured to communicate the final reconstructed 3D structure to the user terminal 110, via the communication network 108. In accordance with an embodiment, the reconstruction of the 3D structures may be performed again when a modified viewpoint change request is received from the user terminal 110, as already explained above.

In accordance with a second aspect of the disclosure, the user terminal 110 may be configured to communicate the received user input to the server 106. Based on the user input, the server 106 may be configured to receive information from the plurality of UAVs 102 associated with the plurality of imaging devices 104. In such a case, the plurality of UAVs 102 and the server 106 may be in a mesh network, via a wireless communication channel, such as Wi-Fi. The information may comprise focal lens information, current location and current orientation of the plurality of UAVs 102 associated with the plurality of imaging devices 104. The information may be determined by the plurality of UAVs 102, based on a first set of sensors, such as gyroscopes, installed therein. The information may be refined by the plurality of UAVs 102, based on a second set of sensors, such as image sensors, installed therein.

In accordance with an embodiment, the server 106 may be configured to determine calibration information of the plurality of UAVs 102, based on the received focal lens information and a plurality of images of a common pre-determined calibration object, such as a checkerboard. The plurality of images of the pre-determined calibration object may be captured by the plurality of imaging devices 104 from one or more angles and directions. The server 106 may be configured to communicate the determined calibration information to the plurality of imaging devices 104 associated with the plurality of UAVs 102. Accordingly, calibration of the plurality of imaging devices 104 may be performed by the respective UAVs from the plurality of UAVs 102. As explained above, the calibration of the plurality of imaging devices 104 may be performed by the plurality of UAVs 102 to adjust one or more intrinsic and/or extrinsic parameters of the plurality of imaging devices 104.

In accordance with an embodiment, the server 106 may be configured to determine a target location and a target orientation of the plurality of imaging devices 104. The target location and a target orientation may be determined based on the received focal lens information, the received current location, the received current orientation, and the current location of the selected one or more static and/or moving objects. A person with ordinary skill in the art will understand that the target locations and the target orientations of the plurality of imaging devices 104 may correspond to an optimal arrangement of the plurality of imaging devices 104 around the selected one or more static and/or moving objects. The optimal arrangement of the plurality of UAVs 102 corresponds to maximal coverage of a 3D scene structure that includes the selected one or more static and/or moving objects at a pre-determined resolution of the plurality of imaging devices 104.

In accordance with an embodiment, the server 106 may be configured to communicate control information to the plurality of UAVs 102. Based on the received control information, the plurality of UAVs 102 may modify the current location and the current orientation of the plurality of imaging devices 104. The current location and the current orientation of the plurality of imaging devices 104 may be modified to the determined target location and the determined target orientation.

Once the plurality of UAVs 102 modify their current locations and the current orientations to the target locations and target orientations, the plurality of imaging devices 104 may capture a set of images of the one or more static and/or moving objects. The set of images may correspond to images captured by the plurality of imaging devices 104 in a synchronized manner. Each image in the set of images may be dynamically synchronized with respect to the other images, based on synchronization signals transmitted by the server 106. The synchronization signal may establish a timing correlation between the pluralities of imaging devices 104 so that the set of images exhibit a time-lapse of minimal time in real-time.

The plurality of imaging devices 104 may be further configured to collaboratively capture motion information associated with the selected one or more static and/or moving objects. In accordance with an embodiment, the motion information may be collaboratively captured by the plurality of imaging devices 104, based on one or more spherical positions of the one or more static or moving objects with or without marker information, known in the art. The plurality of UAVs 102 may communicate the captured set of images and motion information of the selected one or more static and/or moving objects to the server 106.

In accordance with an embodiment, the server 106 may be further configured to perform a real-time reconstruction of 3D structure of the selected one or more static and/or moving objects, based on the received set of images. Such real-time 3D structure reconstruction may be performed by the server 106, in accordance with a first application. Notwithstanding, the disclosure may not be so limited, and another 3D structure reconstruction may be performed in accordance with another application and different target locations and target orientations of the plurality of UAVs, without deviation from the scope of the disclosure.

Figure 3:
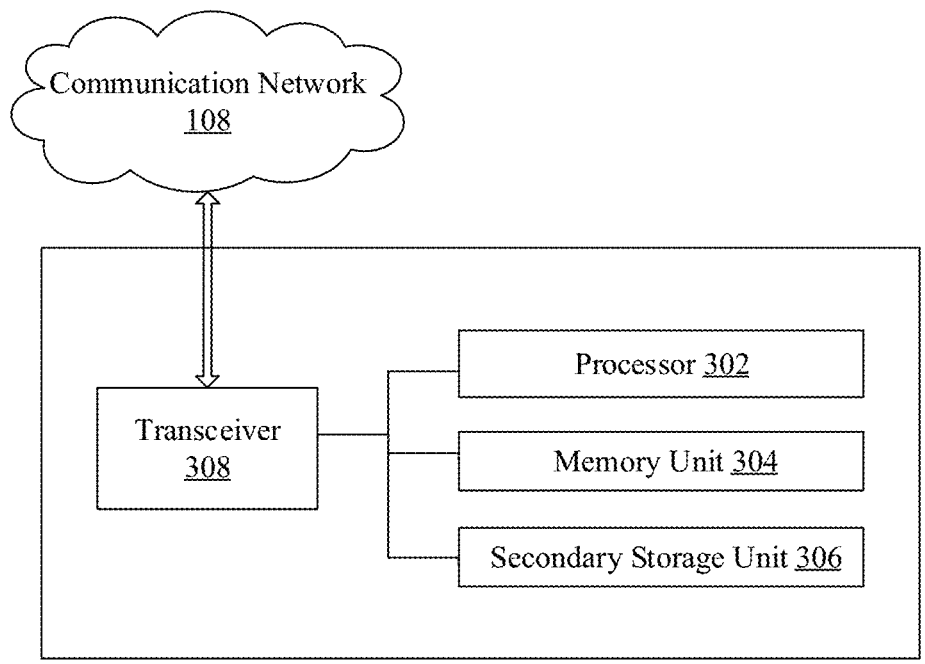
FIG. 3 is a block diagram that illustrates an exemplary server, in accordance with an embodiment of the disclosure.

The reconstruction of the 3D structure may be performed by the server 106, based on 3D scene interpretation and/or point cloud generation for the selected one or more static and/or moving objects, as explained in detail in FIG. 3. The server 106 may be further configured to communicate the reconstructed 3D structure to the user terminal 110, via the communication network 108. The user terminal 110 may display the received reconstructed 3D structure.

In accordance with a third aspect of the disclosure, the user terminal 110 may be configured to communicate the received user input to more than one UAVs of the plurality of UAVs 102, such as the first UAV 102a and the third UAV 102c. A person ordinary skilled in the art will understand that the communication of the user input to the first UAV 102a and the third UAV 102c has been described for exemplary purpose, which may not be construed to limit the disclosure. It may be assumed in this example, that the first UAV 102a and the third UAV 102c may be pre-configured and/or pre-programmed to be master or controller devices (due to sufficiency of computational resources) to monitor the plurality of UAVs 102. Notwithstanding, the disclosure may not be limited to the configuration of the first UAV 102a and the third UAV 102c to be pre-programmed as master devices or controllers. Others of the plurality of UAVs 102 with sufficient computational resources may be configured or programmed as the master devices or controllers, without deviation from the scope of the disclosure.

In accordance with an embodiment, the first UAV 102a and the third UAV 102c may be configured to identify a first and a second set of UAVs, respectively. The identification may be based on one or more criteria, such as physical proximity and/or corresponding states of computational resources. The first UAV 102a and the third UAV 102c may be further configured to determine which of the one or more other UAVs 102b and 102d, may be included in the first and the second set of UAVs. For example, the first UAV 102a may identify that the second UAV 102b may be included in the first set of UAVs. The second UAV 102b may be identified to be nearest to the first UAV 102a with limited computational resources, such as insufficient memory availability. Thus, a first network may be established that includes the first UAV 102a and the second UAV 102b. The first network may be also referred to as a first cluster. Similarly, the third UAV 102c may identify that the fourth UAV 102d may be included in the second set of UAVs. The fourth UAV 102d may be identified to be nearest to the third UAV 102c with limited computational resources, such as marginal battery level. Thus, a second network may be established that includes the third UAV 102c and the fourth UAV 102d. The second network may be also referred to as a second cluster.

In accordance with an embodiment, based on the user input, the first UAV 102a in the first cluster may be configured to receive information from the second UAV 102b. Similarly, the third UAV 102c in the second cluster may be configured to receive information from the fourth UAV 102d. The information may comprise focal lens information, current location and current orientation of the second imaging device 104b and the fourth imaging device 104d associated with the second UAV 102b and the fourth UAV 102d, respectively. The information may be determined by the second UAV 102b and the fourth UAV 102d, based on a first set of sensors, such as gyroscopes, installed therein. The information may be refined by the second UAV 102b and the fourth UAV 102d, based on a second set of sensors, such as image sensors, installed therein. The first UAV 102a and the third UAV 102c may be further configured to determine a current location of the selected one or more static and/or moving objects in the received user input.

In accordance with an embodiment, the first UAV 102a in the first cluster may be configured to determine calibration information of the second imaging device 104b. The calibration may be based on the received focal lens information and a plurality of images of a common pre-determined calibration object, as described above. Similarly, the third UAV 102c in the second cluster may be configured to determine calibration information of the fourth imaging device 104d. The calibration may be based on the received focal lens information and a plurality of images of the common pre-determined calibration object. The first UAV 102a and the third UAV 102c may be configured to communicate the determined calibration information to the second imaging device 104b and the fourth imaging device 104d, respectively.

The calibration of the second imaging device 104b and the fourth imaging device 104d may be performed by the second UAV 102b and the fourth UAV 102d. The calibration may be performed to adjust one or more intrinsic and/or extrinsic parameters of the second imaging device 104b and the fourth imaging device 104d.

In accordance with an embodiment, the first UAV 102a in the first cluster may be configured to determine a target location and a target orientation of the second imaging device 104b. Similarly, the third UAV 102c in the second cluster may be configured to determine a target location and a target orientation of the fourth imaging device 104d. The target location and a target orientation may be determined based on the received focal lens information, the received current location, the received current orientation, and the current location of the selected one or more static and/or moving objects. The first UAV 102a and the third UAV 102c may be configured to determine their target location and target orientation, in accordance with a triangulation technique in respective clusters. A person with ordinary skill in the art will understand that the target locations and the target orientations of the plurality of imaging devices 104 may correspond to an optimal arrangement of the plurality of imaging devices 104 around the selected one or more static and/or moving objects. The optimal arrangement of the plurality of UAVs 102 corresponds to maximal coverage of a 3D scene structure that includes the selected one or more static and/or moving objects at a pre-determined resolution of the plurality of imaging devices 104.

In accordance with an embodiment, the first UAV 102a in the first cluster may be configured to communicate control information to the second UAV 102b. Similarly, the third UAV 102c in the second cluster may be configured to communicate control information to the fourth UAV 102d. Based on the received control information, the second UAV 102b and the fourth UAV 102d may modify the current location and the current orientation of the second imaging device 104b and the fourth imaging device 104d, respectively. The current location and the current orientation of the second imaging device 104b and the fourth imaging device 104d may be modified to the determined target location and the determined target orientation. In accordance with an embodiment, the first UAV 102a and the third UAV 102c may be configured to modify its current location and the current orientation to the target location and the target orientation, determined via the triangulation technique.

Once the plurality of UAVs 102 modify their current locations and the current orientations to the target locations and target orientations, the plurality of imaging devices 104 may capture a plurality of images of the one or more static and/or moving objects. The plurality of images may be captured by the plurality of imaging devices 104 in different clusters. A first plurality of images may include images captured by the first imaging device 104a of the first UAV 102a and the second imaging device 104b of the second UAV 102b in the first cluster. A second plurality of images may include images captured by the third imaging device 104c of the third UAV 102c and the fourth imaging device 104d of the fourth UAV 102d in the second cluster. The first plurality of images may be dynamically synchronized with the second plurality of images, based on synchronization signals communicated between the first UAV 102a and the third UAV 102c. The synchronization signal may establish a timing correlation between the first cluster and the second cluster so that the first plurality of images and the second plurality of images exhibit a time-lapse of minimal time in real-time.

The plurality of imaging devices 104 in different clusters may be further configured to collaboratively capture motion information associated with the selected one or more static and/or moving objects. In accordance with an embodiment, the motion information may be collaboratively captured by the plurality of imaging devices 104, based on one or more spherical positions of the one or more static and/or moving objects with or without marker information, known in the art.

Based on the first plurality of images, the first UAV 102a may be further configured to perform a real-time reconstruction of 3D structure of the selected one or more static and/or moving objects. Similarly, the third UAV 102c may be configured to perform a real-time reconstruction of 3D structure of the selected one or more static and/or moving objects, based on the second plurality of images. Such real-time 3D structure reconstruction may be performed by the first UAV 102a and the third UAV 102c, in accordance with a first application. A person with ordinary skill in the art may understand that the above-mentioned 3D structure reconstruction is performed in accordance with the first application for illustrative purpose. Notwithstanding, the disclosure may not be so limited, and another 3D structure reconstruction may be performed in accordance with another application and different target locations and target orientations of the plurality of UAVs, without deviation from the scope of the disclosure.

The reconstruction of the two 3D structures may be performed by the first UAV 102a and the third UAV 102c, based on 3D scene interpretation and/or point cloud generation for the selected one or more static and/or moving objects. The 3D scene interpretation and/or point cloud generation for the selected one or more static and/or moving objects may be performed, based on the target locations and target orientations of the plurality of UAVs 102 from where the set of images is captured. In accordance with an embodiment, the first UAV 102a and the third UAV 102c may be further configured to communicate the two reconstructed 3D structures from the first set of images and the second set of images to the user terminal 110, via the communication network 108. Thus, in such a case, the user terminal 110 may receive the two reconstructed 3D structures for display. In accordance with an embodiment, the user terminal 110 may be further operable to receive another user input to modify the viewpoint of the reconstructed 3D structure. A request that corresponds to the modified viewpoint may be communicated back to the first UAV 102a. Based on the request, the first UAV 102a and the third UAV 102c may again determine a new target location and target orientation of the UAVs in the first and the second cluster, respectively. The first UAV 102a and the third UAV 102c may receive a new set of images from the UAVs, in a similar manner as described above. Reconstruction of the 3D structure may be again performed, and communicated to the user terminal 110, via the communication network 108, in a similar manner as described above.

In accordance with an embodiment, based on the latest values of the state variables, the first UAV 102a may determine that the first UAV 102a and the third UAV 102c now exhibit limited resources and the server 106 exhibits available resources. In such a case, the first UAV 102a and the third UAV 102c may transmit the two 3D reconstructed structures to the server 106 for a further reconstruction of a final 3D structure. The server 106 may be further configured to communicate the reconstructed final 3D structure to the user terminal 110, via the communication network 108, for display. The user terminal 110 may be further operable to receive another user input to modify the viewpoint of the 3D reconstructed structure. A request that corresponds to the modified viewpoint may be communicated back to the server 106. Based on the request, the server 106 may again determine a new target location and target orientation of the plurality of UAVs 102, and receive a new set of images from the UAVs 102, in a similar manner as described above. The server 106 may again reconstruct the 3D structure, and communicate the reconstructed 3D structure to the user terminal 110, via the communication network 108, for display.

Figure 2:
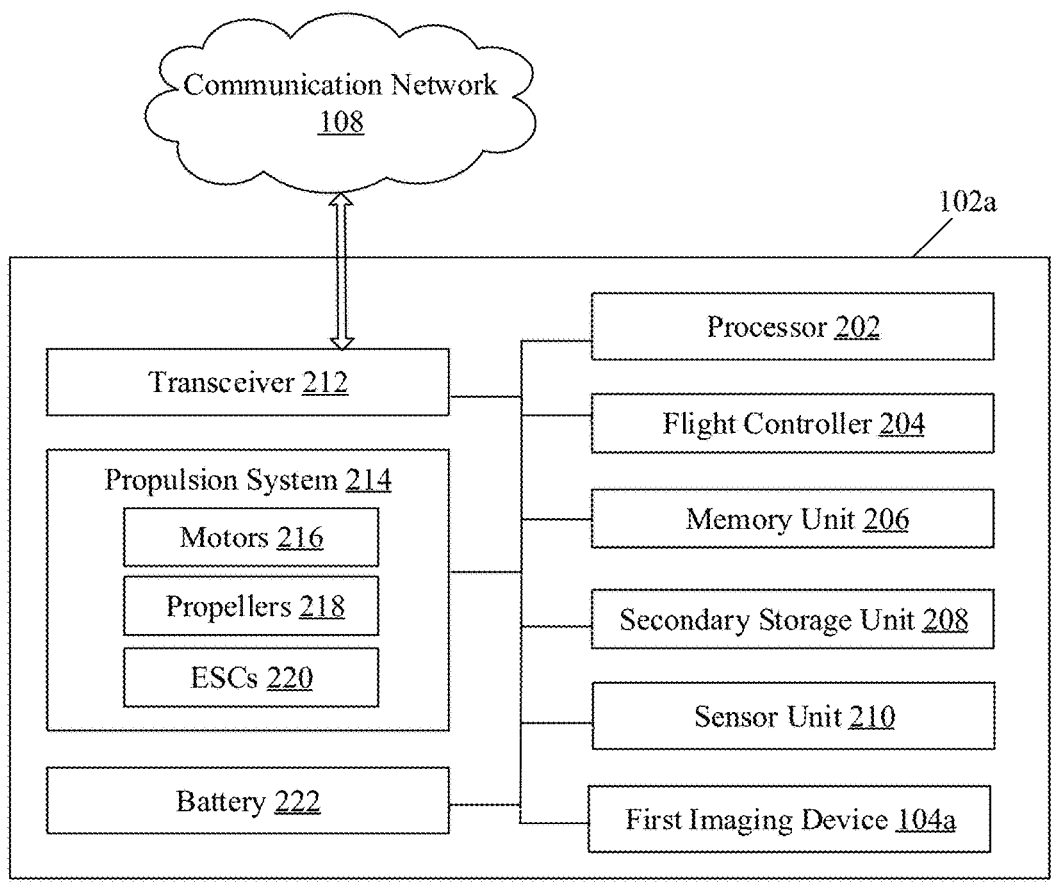
FIG. 2 is a block diagram that illustrates various components of an exemplary unmanned aerial vehicle (UAV), in accordance with an embodiment of the disclosure.

FIG. 2 is a block diagram that illustrates an exemplary UAV, in accordance with an embodiment of the disclosure. With reference to FIG. 2, there is shown the block diagram of the first UAV 102a from the plurality of UAVs 102. The first UAV 102a may comprise one or more processors, such as a processor 202, a flight controller 204, a memory unit 206, a secondary storage unit 208, a sensor unit 210, the first imaging device 104a, and a transceiver 212. The first UAV 102a may further comprise a propulsion system 214 that further includes motors 216, propellers 218, electronic speed controllers (ESCs) 220, and a battery 222. The processor 202 may be communicatively connected with the flight controller 204, the memory unit 206, the secondary storage unit 208, the sensor unit 210, the first imaging device 104a, the transceiver 212, and the propulsion system 214.

The processor 202 may comprise suitable logic, circuitry, interfaces, and/or code that may be operable to execute one or more instructions retrieved from the memory unit 206. The processor 202 may be further configured to process multiple images received from one or more other UAVs 102b to 102d, via the transceiver 212. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The flight controller 204 may comprise suitable logic, circuitry, and/or interfaces that may be configured to include programmable microcontrollers communicatively coupled with the sensing unit to auto-control the first UAV 102a. The flight controller 204 may determine and store various control system variables in the memory unit 206 and/or the secondary storage unit 208. Examples of the control variables may include, but are not limited to, an operational mode (automatic/manual), controller(s) state variables (such as position and/or speed), and/or error notifications. A flight controller 204 may be associated with one or more flight modes that are based on a way in which the flight controller uses the sensing unit and radio control input in order to fly and stabilize the first UAV 102a. The flight controller 204 may be implemented based on various hardware and software components and configurations, known in the art.

The memory unit 206 may comprise suitable logic, circuitry, and/or interfaces that may be configured to store a machine code and/or a computer program with at least one code section executable by the processor 202. Examples of implementation of the memory unit 206 may include, but are not limited to, Random Access Memory (RAM), Read Only Memory (ROM), Dynamic Random Access Memory (DRAM), Static Random Access Memory (SRAM), Thyristor Random Access Memory (T-RAM), Zero-Capacitor Random Access Memory (Z-RAM), and/or a cache memory.

The secondary storage unit 208 may comprise suitable logic, circuitry, interfaces, and/or code that may be configured to store different computational parameters, such as memory space, storage capability and information processing capability of the plurality of UAVs 102 and the server 106. The secondary storage unit 208 may be configured to store controller state variables of the plurality of UAVs 102. The secondary storage unit 208 may be further configured to store path planners that may be determined by the processor 202. Examples of the secondary storage unit 208 may include, but are not limited to, an in-memory database, an active database, a cloud database, a deductive database, a distributed database, an embedded database, a real-time database, a parallel database, a spatial database, and/or a temporal database.

The sensor unit 210 may comprise suitable logic, circuitry, interfaces, and/or code that may be configured to handle sensor data detected by one or more sensors. Example of the sensor unit 210 may include, but not limited to, a geographical positioning system (GPS), a gyroscope, a motion sensor, a light sensor, a thermal sensor, an altitude sensor, an inertial sensor, a photoelectric sensor, an infrared sensor, a photodetector, a pressure sensor, a magnetic compass, an accelerometer, and/or an optical position sensor. For example, the GPS, in conjunction with the barometric altitude sensor, may determine a 3D location and orientation information of the first UAV 102a.

The transceiver 212 may comprise suitable logic, circuitry, interfaces, and/or code that may be configured to transmit/receive commands, information, and/or images to other devices, via the communication network 108. The transceiver 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (IEEE 802.11a, IEEE 802.11b, IEEE 802.11g and/or IEEE 802.11n), voice over Internet Protocol (VoIP), Wi-MAX, a protocol for email, instant messaging, and/or Short Message Service.

The propulsion system 214 is a set of mechanical and electrical components that generates thrust to push the first UAV 102a upward and forward during the flight. The thrust may be generated collectively by the motors 216, the propellers 218, the ESCs 220, and the battery 222.

The motors 216 may be preferably brushless direct current (BLDC) motors in which coils are fixed either to outer casing or inner casing, and magnets rotate. The brushless DC motors may be one of an in-runner, an outrunner, or a hybrid runner motors, based on rotation speed for a given voltage.

The propellers 218 may include rotor blades with a pre-specified diameter that rotate on a pre-configured speed to produce a minimum thrust for the first UAV 102a. In addition to the pre-specified diameter, the propellers 218 are further associated with a shape, an angle of attack, a pitch, and a surface area of the rotor blades. The propellers may be manufactured via different materials, such as injection-molded plastic, fiber-reinforced polymer, or natural materials (such as wood). The propellers 218 may be further connected with propeller guards (or "prop guards") that provide a fixed ring/cushion around the propellers 218.

The ESCs 220 may comprise suitable logic, circuitry, interfaces, and/or code that may be configured to allow the flight controller 204 to control the speed and direction of the motors 216. A typical ESC may include a power input connected with the battery 222, bullet connectors connected to the motors 216, and radio controlled servo connectors to accept radio control signals to power the electronics in the first UAV 102a.

The battery 222 may be source of electric power for the one or more electric circuits or loads of the first UAV 102a. For example, the loads may include, but are not limited to the motors 216, electrically powered adjustable components, such as the first imaging device 104a, and/or other on-board system, such as radio, speakers, electronic navigation system, electrically controlled, powered and/or assisted steering system. The battery 222 may be a rechargeable battery, exclusively Lithium polymer (LiPo) with various variations, such as Lithium-Manganese.

In operation, the processor 202, in conjunction with the flight controller 204, may perform a pre-flight diagnostic process to monitor system controls and state variables associated with the first UAV 102a. Once the pre-flight diagnostic process is successful, the flight controller 204, in conjunction with the propulsion system 214, may initiate the flight and become air-borne. Thereafter, the first UAV 102a, which is now air-borne, may perform in-flight diagnostic process to periodically monitor its system controls and state variables.

In accordance with an embodiment, the processor 202 in conjunction with the flight controller 204 may be configured to communicate with the one or more other UAVs 102b to 102d, the server 106, and the user terminal 110, via the communication network 108 (such as Wi-Fi). The communication may occur, in accordance with a flight plan. In accordance with an embodiment, the flight plan may be pre-specified and pre-stored in the memory unit 206 and/or the secondary storage unit 208, before the flight. In accordance with an embodiment, the flight plan may be dynamically determined by the processor 202 in conjunction with the sensor unit 210, during the flight.

In accordance with an embodiment, the processor 202 may communicate with the one or more other UAVs 102b to 102d in a mesh network or an ad-hoc network, based on various wireless protocols known in the art. In accordance with an embodiment, the processor 202 may be further configured to centrally monitor system controls and state variables of the plurality of UAVs 102 and/or the server 106. In accordance with an example, the processor 202 may be configured to record the system controls and state variables of the plurality of UAVs 102 and/or the server 106 in a state variable table. The processor 202 may store the state variable table in the memory unit 206 and/or the secondary storage unit 208. The processor 202 may further periodically update the state variable table based on the latest state variables of the plurality of UAVs 102 and/or the server 106. In accordance with an embodiment, the processor 202 may be pre-configured and/or pre-programmed to be a master device to monitor the plurality of UAVs 102 and/or the server 106.

In accordance with an embodiment, the transceiver 212 may be configured to receive a user input from the user terminal 110, via the communication network 108. The user input may be provided by a user at the user terminal 110, via an I/O device (such as a touch screen). The received user input may include a selection of one or more static and/or moving objects. The one or more static and/or moving objects may be displayed at the user terminal 110 in a video stream. For example, a live soccer match may be displayed at the user terminal 110. The user may be a sports analyst who may want to analyze a specific shot played by a player in motion during the soccer match. For that, the user may provide a touch input at the display screen of the user terminal 110 to select the player in motion.

In accordance with an embodiment, the processor 202 may be configured to automatically determine the one or more static and/or moving objects from the FOV of the first imaging device 104a. Such an automatic determination may be based on identification of the one or more static and/or moving objects as a salient object. The saliency of the one or more static and/or moving objects may be based on higher pixel intensity that corresponds to the object with respect to other objects in the foreground or background of the image. The saliency of the one or more static and/or moving objects may be further based on optical flow of the object with respect to the other objects. Notwithstanding, the disclosure may not be so limited, and the processor 202 may identify the object as a salient object based on other saliency parameters, known in the art, without any deviation from the scope of the disclosure.

In accordance with a first aspect of the disclosure, the processor 202 may be configured to receive the user input from the transceiver 212. A person ordinary skilled in the art will understand that the receipt of the user input by the processor 202 of the first UAV 102a has been described for exemplary purpose, which may not be construed to limit the disclosure. It may be assumed in this example, that the first UAV 102a may be pre-configured and/or pre-programmed to be a master device (due to sufficiency of computational resources) to monitor the plurality of UAVs 102 and/or the server 106. Notwithstanding, the disclosure may not be limited to the configuration of the first UAV 102a to be pre-programmed as a master device or a controller. Others of the plurality of UAVs 102 with sufficient computational resources may be configured or programmed as the master device, without deviation from the scope of the disclosure.

In accordance with an embodiment, based on the received user input, the processor 202 may be configured to receive information from the one or more other UAVs 102b to 102d and/or the server 106 in a mesh network, via a wireless communication channel, such as Wi-Fi. The information may comprise focal lens information, current location and current orientation of the one or more imaging devices 104b to 104d associated with the one or more other UAVs 102b to 102d. As described in FIG. 1, the information may be determined by the one or more other UAVs 102b to 102d, based on various sets of sensors in respective sensor units. The processor 202 may be further configured to determine a current location of the selected one or more static and/or moving objects in the received user input.

In accordance with an embodiment, the processor 202 may be configured to determine calibration information of the one or more other UAVs 102b to 102d, based on the received focal lens information and a plurality of images of a common pre-determined calibration object, such as a checkerboard. The processor 202 may be configured to communicate the determined calibration information to the one or more imaging devices 104b to 104d, associated with the one or more other UAVs 102b to 102d. Accordingly, calibration of the one or more imaging devices 104b to 104d, may be performed by the respective one or more other UAVs 102b to 102d. Accordingly, one or more intrinsic and/or extrinsic parameters of each of the one or more imaging devices 104b to 104d, may be adjusted. The processor 202 may be further configured to adjust the intrinsic and extrinsic parameters of the first imaging device 104a also.

In accordance with an embodiment, the processor 202 may be configured to determine a target location and a target orientation of the one or more imaging devices 104b to 104d. The target location and a target orientation may be determined based on the received focal lens information, the received current location, the received current orientation, and the current location of the selected one or more static and/or moving objects. The processor 202 may be configured to determine its target location and target orientation, in accordance with a triangulation technique, as explained in FIGS. 5A to 5D. A person with ordinary skill in the art will understand that the target locations and the target orientations of the plurality of imaging devices 104 may correspond to an optimal arrangement of the plurality of imaging devices 104 around the selected one or more static and/or moving objects, as described in FIG. 1.

In accordance with an embodiment, the processor 202 may be configured to communicate control information to the one or more other UAVs 102b to 102d. Based on the received control information, the one or more other UAVs 102b to 102d may modify the current location and the current orientation of the one or more imaging devices 104b to 104d. The current location and the current orientation of the one or more imaging devices 104b to 104d may be modified to the determined target location and the determined target orientation. In accordance with an embodiment, the processor 202 in conjunction with the flight controller 204, may be configured to modify its current location and the current orientation to the target location and the target orientation, determined via the triangulation technique.

Once the plurality of UAVs 102 modify their current locations and the current orientations to the target locations and target orientations, the plurality of imaging devices 104 may capture a set of images of the one or more static and/or moving objects. The set of images may include a first set of images captured by the first imaging device 104a of the first UAV 102a. The second set of images may be captured by the one or more imaging devices 104b to 104d of the one or more other UAVs 102b to 102d, respectively. The first set of images may be dynamically synchronized with the second set of images, based on synchronization signals transmitted by the first UAV 102a, as described in FIG. 1. The plurality of imaging devices 104 may be further configured to collaboratively capture motion information associated with the selected one or more static and/or moving objects, based on one or more spherical positions of the one or more static and/or moving objects with or without marker information.

The processor 202 may be further configured to dynamically determine a processing mode, based on which the set of images captured by the plurality of imaging devices 104 may be processed. The processing mode may correspond to a distributed processing mode, centralized processing mode, or a clustered processing mode, as described in FIGS. 4A, 4B, and 4C, respectively. The processor 202 may dynamically determine the processing mode, based on the state of the computational resources retrieved from the state variable table, updated during the latest in-flight diagnostic process. The computational resources may correspond to the computational bandwidth, the memory availability, and/or the battery level of the plurality of the UAVs 102 and the server 106. Accordingly, the processor 202 may select one of the plurality of UAVs 102 or the server 106, to process the set of images in the most optimal manner.

In accordance with an embodiment, based on the state of the computational resources, the processor 202 may determine that maximum computational bandwidth, the memory availability, and/or the battery level are available with the first UAV 102a. In such a case, the processor 202 may be configured to receive the second set of images from the one or more other UAVs 102b to 102d, via the transceiver 212. The processor 202 may be further configured to perform a real-time reconstruction of 3D structure of the selected one or more static and/or moving objects, based on the captured first set of images and the received second set of images. Such real-time 3D structure reconstruction may be performed by the processor 202, in accordance with a first application. A person with ordinary skill in the art may understand that the above-mentioned 3D structure reconstruction is performed in accordance with the first application for illustrative purpose. Notwithstanding, the disclosure may not be so limited, and another 3D structure reconstruction may be performed in accordance with another application and different target locations and target orientations of the plurality of UAVs 102, without deviation from the scope of the disclosure.

The reconstruction of the 3D structure may be performed by the processor 202, based on 3D scene interpretation and/or point cloud generation for the selected one or more static and/or moving objects. The 3D scene interpretation and/or point cloud generation for the selected one or more static and/or moving objects may be performed, based on the target locations and target orientations of the plurality of UAVs 102 from where the set of images is captured.

In accordance with an embodiment, based on the state of the computational resources, the processor 202 may determine that the server 106 exhibits maximum computational bandwidth, the memory availability, and/or the battery level out of the plurality of UAVs 102 and the server 106. In such a case, the processor 202 may be configured to communicate the captured first set of images and the received second set of images to the server 106, via the transceiver 212 and the communication network 108. The server 106 may be further configured to perform a real-time reconstruction of 3D structure of the selected one or more static and/or moving objects, based on the received first and the second set of images, in a similar way as described above.

In accordance with an embodiment, based on the state of the computational resources, the processor 202 may determine that both the first UAV 102a and the third UAV 102c exhibit maximum computational bandwidth, memory availability, and/or battery level out of the plurality of UAVs 102 and the server 106. In such a case, the processor 202 may be configured to identify a first set of UAVs, based on one or more criteria, such as physical proximity and/or corresponding values of state variables. The processor 202 may be further configured to determine which of the one or more other UAVs 102b and 102d, may be included in the first set of UAVs. For example, the processor 202 may identify that the second UAV 102b may be included in the first set of UAVs. The second UAV 102b may be identified to be nearest to the first UAV 102a with limited computational resources, such as insufficient memory availability. Thus, a first network may be established that includes the first UAV 102a and the second UAV 102b. The first network may be also referred to as a first cluster. Similarly, the third UAV 102c may identify that the fourth UAV 102d may be included in a second set of UAVs. The fourth UAV 102d may be identified to be the nearest to the third UAV 102c and has limited resources, such as marginal battery level. Thus, a second network may be established that includes the third UAV 102c and the fourth UAV 102d. The second network may be also referred to as a second cluster.

In such a case, the processor 202 may receive a set of images from the second UAV 102b. The set of images captured by the first imaging device 104a and the received set of images in the first cluster may be collectively referred to as a first set of images. Similarly, the fourth UAV 102d communicates the captured set of images to the third UAV 102c. The set of images captured by the third UAV 102c and the fourth UAV 102d in the second cluster may be collectively referred to as a second set of images.

The processor 202 in the first UAV 102a and a similar processor in the third UAV 102c may be further configured to perform a real-time reconstruction of 3D structure of the selected one or more static and/or moving objects, based on the first set of images and the second set of images, respectively. Such real-time 3D structure reconstruction may be performed by the processor 202 and the other processor, in accordance with an application.

The reconstruction of the two 3D structures may be performed by the processor 202 and the other processor, based on 3D scene interpretation and/or point cloud generation for the selected one or more static and/or moving objects, as explained in detail in FIG. 3. In accordance with an embodiment, the processor 202 and the other processor may be further configured to communicate the reconstructed 3D structures from the first set of images and the second set of images to the user terminal 110, via the communication network 108. Thus, in such a case, the user terminal 110 may receive the two reconstructed 3D structures for display.

In accordance with an embodiment, based on the latest values of the state variables, the processor 202 may determine that the first UAV 102a and the third UAV 102c now exhibit limited resources and the server 106 exhibits available resources. In such a case, the processor 202 and the other processor may transmit the two 3D reconstructed structures to the server 106 for a further reconstruction of a final 3D structure. The server 106 may be further configured to communicate the final reconstructed 3D structure to the user terminal 110, via the communication network 108.

FIG. 3 is a block diagram that illustrates an exemplary server, in accordance with an embodiment of the disclosure. With reference to FIG. 3, there is shown the block diagram of the server 106. The first UAV 102a may comprise one or more processors, such as a processor 302, a memory unit 304, a secondary storage unit 306, and a transceiver 308. The processor 302 may be communicatively connected with the memory unit 304, the secondary storage unit 306, and the transceiver 308.

In operation, the transceiver 308 may be configured to receive a user input from the user terminal 110, via the communication network 108. The transceiver 308 may further communicate the user input to the processor 302. Based on the user input, the processor 302 may be configured to receive information from the plurality of UAVs 102 associated with the plurality of imaging devices 104, via the transceiver 308. In such a case, the plurality of UAVs 102 and the server 106 may be in a mesh network, via a wireless communication channel, such as Wi-Fi. The information may comprise focal lens information, current location and current orientation of the plurality of UAVs 102 associated with the plurality of imaging devices 104. The information may be determined by the plurality of UAVs 102, based on a first set of sensors, such as gyroscopes, installed therein. The information may be refined by the plurality of UAVs 102, based on a second set of sensors, such as image sensors, installed therein.

In accordance with an embodiment, the processor 302 may be configured to determine calibration information of the plurality of UAVs 102, based on the received focal lens information and a plurality of images of a common predetermined calibration object, such as a checkerboard. The processor 302 may transmit the determined calibration information to each of the plurality of UAVs 102. Accordingly, calibration of the plurality of imaging devices 104 may be performed by the respective UAVs from the plurality of UAVs 102. As explained above, the calibration of the plurality of imaging devices 104 may be performed by the plurality of UAVs 102 to adjust one or more intrinsic and/or extrinsic parameters of the plurality of imaging devices 104.

In accordance with an embodiment, the processor 302 may be configured to determine a target location and a target orientation of the plurality of imaging devices 104. The target location and a target orientation may be determined based on the received focal lens information, the received current location, the received current orientation, and the current location of the selected one or more static and/or moving objects. As described in FIG. 1, a person with ordinary skill in the art will understand that the target locations and the target orientations of the plurality of imaging devices 104 may correspond to an optimal arrangement of the plurality of imaging devices 104 around the selected one or more static and/or moving objects.

In accordance with an embodiment, the processor 302 may be configured to communicate control information to the plurality of UAVs 102, via the transceiver 308. Based on the received control information, the plurality of UAVs 102 may modify the current location and the current orientation of the plurality of imaging devices 104. The current location and the current orientation of the plurality of imaging devices 104 may be modified to the determined target location and the determined target orientation.

Once the plurality of UAVs 102 modify their current locations and the current orientations to the target locations and target orientations, the plurality of imaging devices 104 may capture a set of images of the one or more static and/or moving objects. The set of images may correspond to images captured by the plurality of imaging devices 104 in a synchronized manner. Each image in the set of images may be dynamically synchronized with respect to the other images, based on synchronization signals transmitted by the processor 302.

The plurality of imaging devices 104 may be further configured to collaboratively capture motion information associated with the selected one or more static and/or moving objects. In accordance with an embodiment, the motion information may be collaboratively captured by the plurality of imaging devices 104, based on one or more spherical positions of the one or more static and/or moving objects with or without marker information, known in the art. The plurality of UAVs 102 may communicate the captured set of images and motion information of the selected one or more static and/or moving objects to the transceiver 308, via the communication network 108. The transceiver 308 may further communicate the received set of images and motion information to the processor 302.

In accordance with an embodiment, the processor 302 may be further configured to perform a real-time reconstruction of 3D structure of the selected one or more static and/or moving objects, based on the received set of images and motion information. Such real-time 3D structure reconstruction may be performed by the processor 302, in accordance with a type of application.

The reconstruction of the 3D structure may be performed by the processor 302, based on 3D point cloud generation. The processor 302 may be configured to generate the 3D point cloud based on the received set of images. From the received set of images, the processor 302 may determine a set of data points that represents the external surface of the selected object in a 3D coordinate system. The processor 302 may be further configured to perform 3D scene interpretation to reconstruct overall world geometry from the 3D point cloud. The processor 302 may thereafter estimate shape model and surface model to generate hybrid geometric model for the selected object. Based on the hybrid geometric model, the processor may be configured to perform surface reconstruction of the selected object in a 3D structure space. The processor 302 may be further configured to communicate the reconstructed 3D structure to the user terminal 110, via the communication network 108. The user terminal 110 may display the received reconstructed 3D structure.

Figure 4A:
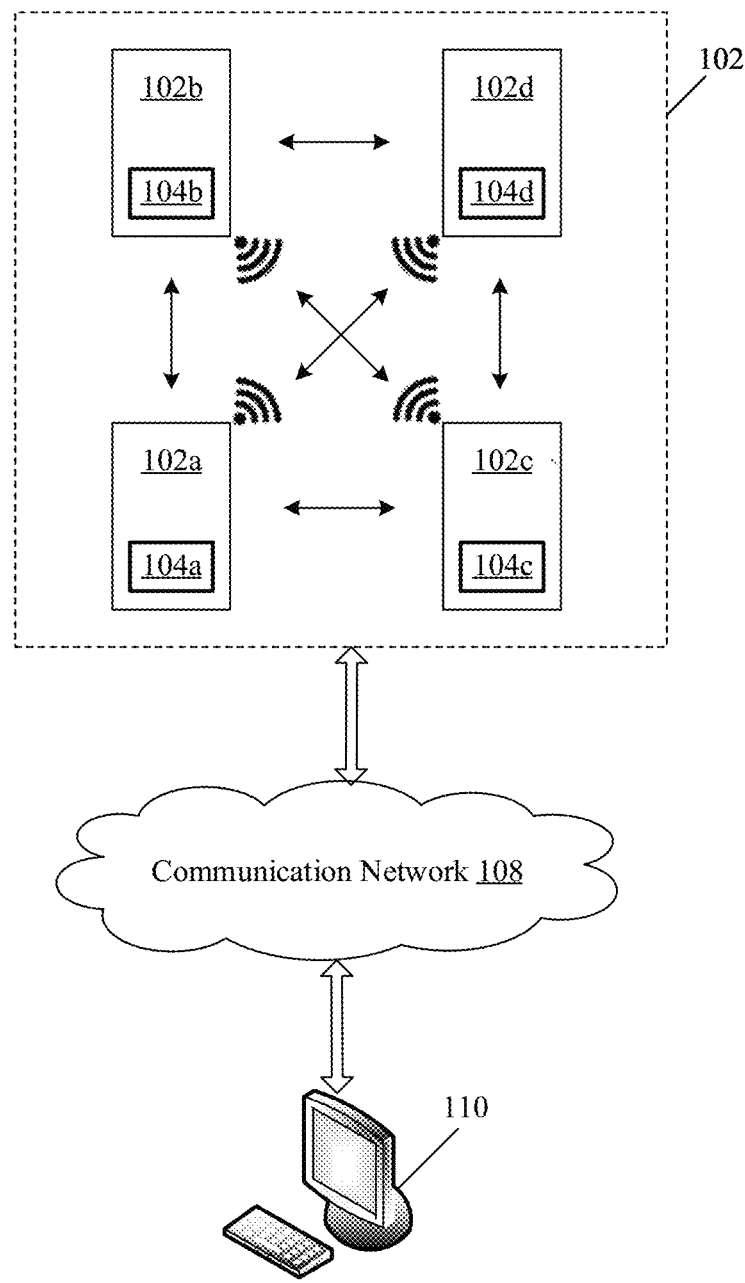
FIG. 4A is a block diagram that illustrates a first network environment that includes a plurality of UAVs and a user terminal for reconstruction of 3D structure in a distributed processing mode, in accordance with an embodiment of the disclosure.

FIG. 4A illustrates a first network environment that includes a plurality of UAVs and a user terminal for 3D structure reconstruction in a distributed processing mode, in accordance with an embodiment of the disclosure. FIG. 4A is described in conjunction with elements of FIGS. 1, 2, and 3. With reference to FIG. 4A, there is the plurality of UAVs 102 in a mesh network. The plurality of UAVs 102 and the user terminal 110 may communicate with each other, via the communication network 108.

In operation, the user terminal 110 may be configured to communicate the user input to one of the plurality of UAVs 102, such as a first UAV 102a. A person ordinary skilled in the art will understand that the communication of the user input to the first UAV 102a has been described for exemplary purpose, which may not be construed to limit the disclosure. It may be assumed in this example, that the first UAV 102a may be pre-configured and/or pre-programmed to be a master device (due to sufficiency of computational resources) to monitor the plurality of UAVs 102 and/or the server 106. Notwithstanding, the disclosure may not be limited to the configuration of the first UAV 102a to be pre-programmed as a master device or a controller. Others of the plurality of UAVs 102 with sufficient computational resources may be configured or programmed as the master device, without deviation from the scope of the disclosure.

In accordance with an embodiment, the first UAV 102a may be further configured to receive information from the one or more other UAVs 102b to 102d, via wireless communication channels, such as Wi-Fi. As explained in FIG. 1, the information may comprise focal lens information, current location and current orientation of the one or more imaging devices 104b to 104d associated with the one or more other UAVs 102b to 102d. The information may be determined by the one or more other UAVs 102b to 102d, based on a first set of sensors, such as gyroscopes, installed therein. The information may be refined by the one or more other UAVs 102b to 102d, based on a second set of sensors, such as image sensors, installed therein. The first UAV 102a may be further configured to determine a current location of the selected one or more static and/or moving objects in the received user input.

In accordance with an embodiment, the first UAV 102a may be configured to determine calibration information of the one or more other UAVs 102b to 102d, based on the received focal lens information and a plurality of images of a common pre-determined calibration object. The first UAV 102a may be further configured to communicate the determined calibration information to the one or more imaging devices 104b to 104d, associated with the one or more other UAVs 102b to 102d. Accordingly, calibration of the one or more imaging devices 104b to 104d, may be performed by the respective one or more other UAVs 102b to 102d to adjust one or more intrinsic and/or extrinsic parameters of the one or more imaging devices 104b to 104d.

In accordance with an embodiment, the first UAV 102a may be configured to determine a target location and a target orientation of the one or more imaging devices 104b to 104d. The target location and a target orientation may be determined based on the received focal lens information, the received current location, the received current orientation, and the current location of the selected one or more static and/or moving objects. The first UAV 102a may be configured to determine its target location and target orientation, in accordance with a triangulation technique, as explained in FIGS. 5A to 5D. A person with ordinary skill in the art will understand that the target locations and the target orientations of the plurality of imaging devices 104 may correspond to an optimal arrangement of the plurality of imaging devices 104 around the selected one or more static and/or moving objects. The optimal arrangement of the plurality of UAVs 102 corresponds to maximal coverage of a 3D scene structure that includes the selected one or more static and/or moving objects at a pre-determined resolution of the plurality of imaging devices 104.

In accordance with an embodiment, the first UAV 102a may be configured to communicate control information to the one or more other UAVs 102b to 102d. Based on the received control information, the one or more other UAVs 102b to 102d may modify the current location and the current orientation of the one or more imaging devices 104b to 104d. The current location and the current orientation of the one or more imaging devices 104b to 104d may be modified to the determined target location and the determined target orientation. In accordance with an embodiment, the first UAV 102a may be configured to modify its current location and the current orientation to the target location and the target orientation, determined via the triangulation technique.

Once the plurality of UAVs 102 modify their current locations and the current orientations to the target locations and target orientations, the plurality of imaging devices 104 may capture a set of images of the one or more static and/or moving objects. The set of images may include a first set of images captured by the first imaging device 104a of the first UAV 102a. The second set of images may be captured by the one or more imaging devices 104b to 104d of the one or more other UAVs 102b to 102d, respectively. The first set of images may be dynamically synchronized with the second set of images, based on synchronization signals transmitted by the first UAV 102a. The synchronization signal may establish a timing correlation between the plurality of imaging devices 104 so that the first set of images and the second set of images exhibit a time-lapse of minimal time in real-time.

The plurality of imaging devices 104 may be further configured to collaboratively capture motion information associated with the selected one or more static and/or moving objects. In accordance with an embodiment, the motion information may be collaboratively captured by the plurality of imaging devices 104, based on one or more spherical positions of the one or more static and/or moving objects with or without marker information, as known in the art.

The first UAV 102a may be further configured to dynamically determine a processing mode, based on which the set of images captured by the plurality of imaging devices 104 may be processed. The processing mode may correspond to a distributed processing mode, centralized processing mode, or a clustered processing mode. The first UAV 102a may dynamically determine the processing mode, based on the state of the computational resources retrieved from the state variable table, updated during the latest in-flight diagnostic process. The computational resources may correspond to the computational bandwidth, the memory availability, and/or the battery level of the plurality of the UAVs 102 and the server 106. Accordingly, the first UAV 102a may select one of the plurality of UAVs 102 or the server 106, to process the set of images in the most optimal manner.

In accordance with an embodiment, the distributed processing mode may be dynamically determined by the first UAV 102a, when the count of the plurality of UAVs 102 in the mesh network exceeds a threshold value. In such a case, the distributed processing mode may improve an overall performance of applications. The distributed processing mode may comprise sharing of load between the pluralities of UAVs 102.

The distributed processing mode may be implemented based on one or more system components installed in each of the plurality of UAVs 102, such as the first UAV 102a. The one or more system components may include: a UAV monitor, a resource allocation manager, a resource negotiator, and a resource migration manager. The UAV monitor may periodically check state variables of the first UAV 102a to determine the status information of the one or more computational resources. Accordingly, the UAV monitor may determine that the first UAV 102a is overloaded in case the status information of the one or more computational resources is below a predefined threshold value. The message manager, in conjunction with the UAV monitor, may determine communication dependency ratio for the first UAV 102a with respect to the one or more other UAVs 102b to 102d. In accordance with an embodiment, the communication dependency ratio for the first UAV 102a with respect to the one or more other UAVs 102b to 102d may exceed a predetermined threshold value. Thus, the resource allocation manager may dynamically distribute one or more computational resources of the one or more other UAVs 102b to 102d to the first UAV 102a. The resource negotiator may negotiate one or more computational resources of the one or more other UAVs 102b to 102d to the first UAV 102a. The resource migration manager may virtually migrate one or more computational resources from the one or more other UAVs 102b to 102d to the first UAV 102a.

For example, when the first UAV 102a exhibits limited memory space, the memory spaces of the one or more other UAVs 102b to 102d may be virtually migrated to the first UAV 102a. In such a case, the first UAV 102a may be configured to utilize the virtual memory spaces migrated from the one or more other UAVs 102b to 102d to perform a real-time 3D structure reconstruction. The real-time reconstruction of 3D structure of the selected one or more static and/or moving objects may be performed, based on the first and the second set of images. Such real-time 3D structure reconstruction may be performed by the first UAV 102a, in accordance with a first application. Notwithstanding, the disclosure may not be so limited, and another 3D structure reconstruction may be performed in accordance with another application and different target locations and target orientations of the plurality of UAVs, without deviation from the scope of the disclosure.

The reconstruction of the 3D structure may be performed by the first UAV 102a, based on 3D scene interpretation and/or point cloud generation for the selected one or more static and/or moving objects, as explained in FIG. 3. In accordance with an embodiment, the first UAV 102a may be further configured to communicate the reconstructed 3D structure to the user terminal 110, via the communication network 108, for display.

Figure 4B:
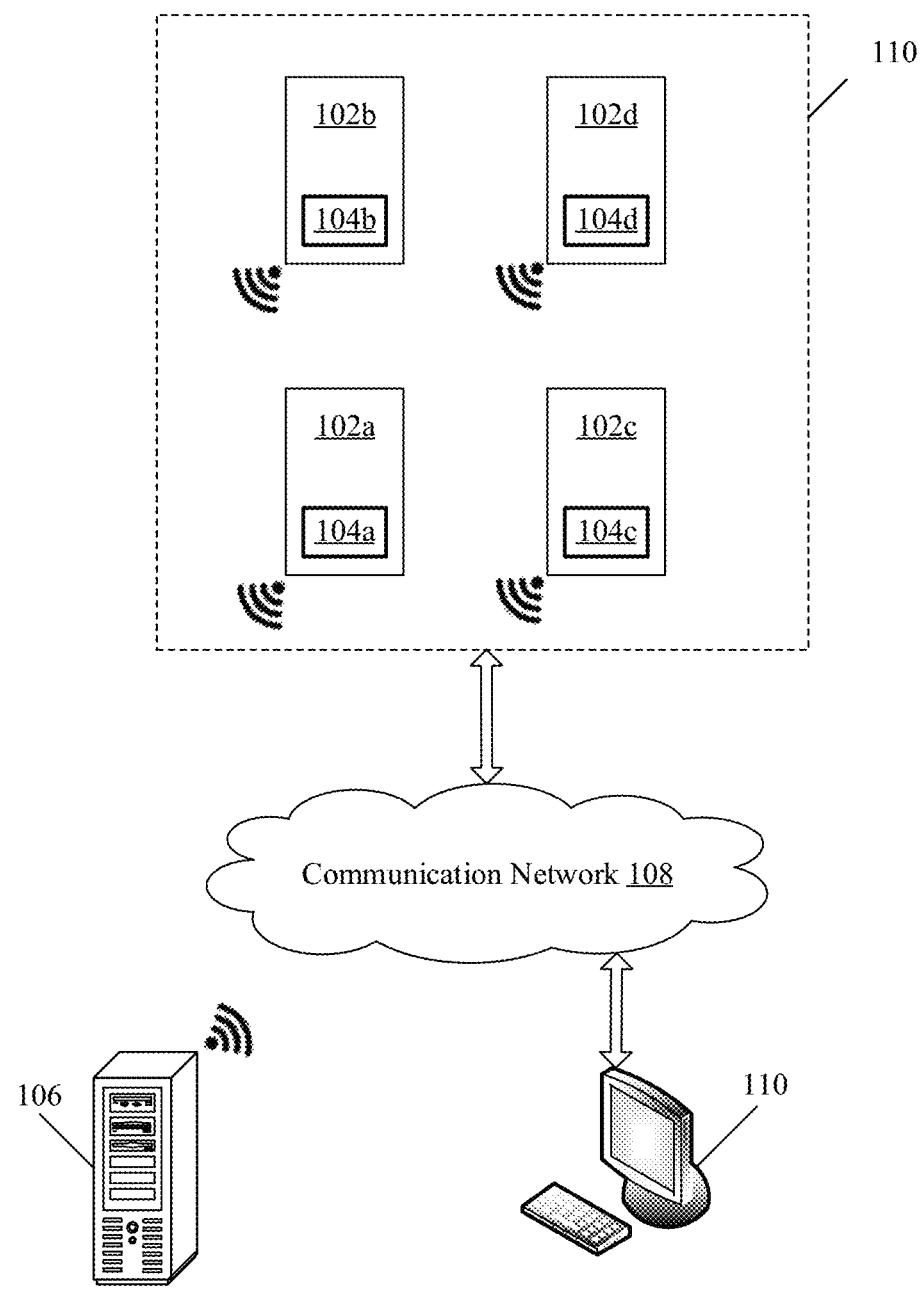
FIG. 4B is a block diagram that illustrates a second network environment that includes a plurality of UAVs and a server for reconstruction of 3D structure in a centralized processing mode, in accordance with an embodiment of the disclosure.

FIG. 4B illustrates a second network environment that includes a plurality of UAVs and a server for 3D structure reconstruction in a centralized processing mode, in accordance with an embodiment of the disclosure. FIG. 4B is described in conjunction with elements of FIGS. 1, 2, and 3. With reference to FIG. 4B, there is the plurality of UAVs 102, the server 106, and the user terminal 110, which communicate with each other, via the communication network 108.

In operation, the user terminal 110 may be configured to communicate the received user input to the server 106. Based on the user input, the server 106 may be configured to receive information from the plurality of UAVs 102 associated with the plurality of imaging devices 104. In such a case, the plurality of UAVs 102 and the server 106 may be in a mesh network, via a wireless communication channel, such as Wi-Fi. The information may comprise focal lens information, current location and current orientation of the plurality of UAVs 102 associated with the plurality of imaging devices 104, as explained in FIG. 4B.

In accordance with an embodiment, the server 106 may be configured to determine calibration information of the plurality of UAVs 102, based on the received focal lens information and a plurality of images of a common predetermined calibration object. The server 106 may be configured to communicate the determined calibration information to the plurality of imaging devices 104 associated with the plurality of UAVs 102. Accordingly, calibration of the plurality of imaging devices 104 may be performed by the respective UAVs from the plurality of UAVs 102. As explained above, the calibration of the plurality of imaging devices 104 may be performed by the plurality of UAVs 102 to adjust one or more intrinsic and/or extrinsic parameters of the plurality of imaging devices 104.

In accordance with an embodiment, the server 106 may be configured to determine a target location and a target orientation of the plurality of imaging devices 104. The target location and a target orientation may be determined based on the received focal lens information, the received current location, the received current orientation, and the current location of the selected one or more static and/or moving objects. A person with ordinary skill in the art will understand that the target locations and the target orientations of the plurality of imaging devices 104 may correspond to an optimal arrangement of the plurality of imaging devices 104 around the selected one or more static and/or moving objects, as explained in FIG. 4B.

In accordance with an embodiment, the server 106 may be configured to communicate control information to the plurality of UAVs 102. Based on the received control information, the plurality of UAVs 102 may modify the current location and the current orientation of the plurality of imaging devices 104. The current location and the current orientation of the plurality of imaging devices 104 may be modified to the determined target location and the determined target orientation.

Once the plurality of UAVs 102 modify their current locations and the current orientations to the target locations and target orientations, the plurality of imaging devices 104 may capture a set of images of the one or more static and/or moving objects. The set of images may correspond to images captured by the plurality of imaging devices 104 in a synchronized manner. Each image in the set of images may be dynamically synchronized with respect to the other images, based on synchronization signals transmitted by the server 106. The plurality of imaging devices 104 may be further configured to collaboratively capture motion information associated with the selected one or more static and/or moving objects. The plurality of UAVs 102 may communicate the captured set of images and motion information of the selected one or more static and/or moving objects to the server 106.

In accordance with an embodiment, the server 106 may be further configured to perform a real-time reconstruction of 3D structure of the selected one or more static and/or moving objects, based on the received set of images, as explained in FIG. 4B.

Figure 4C:
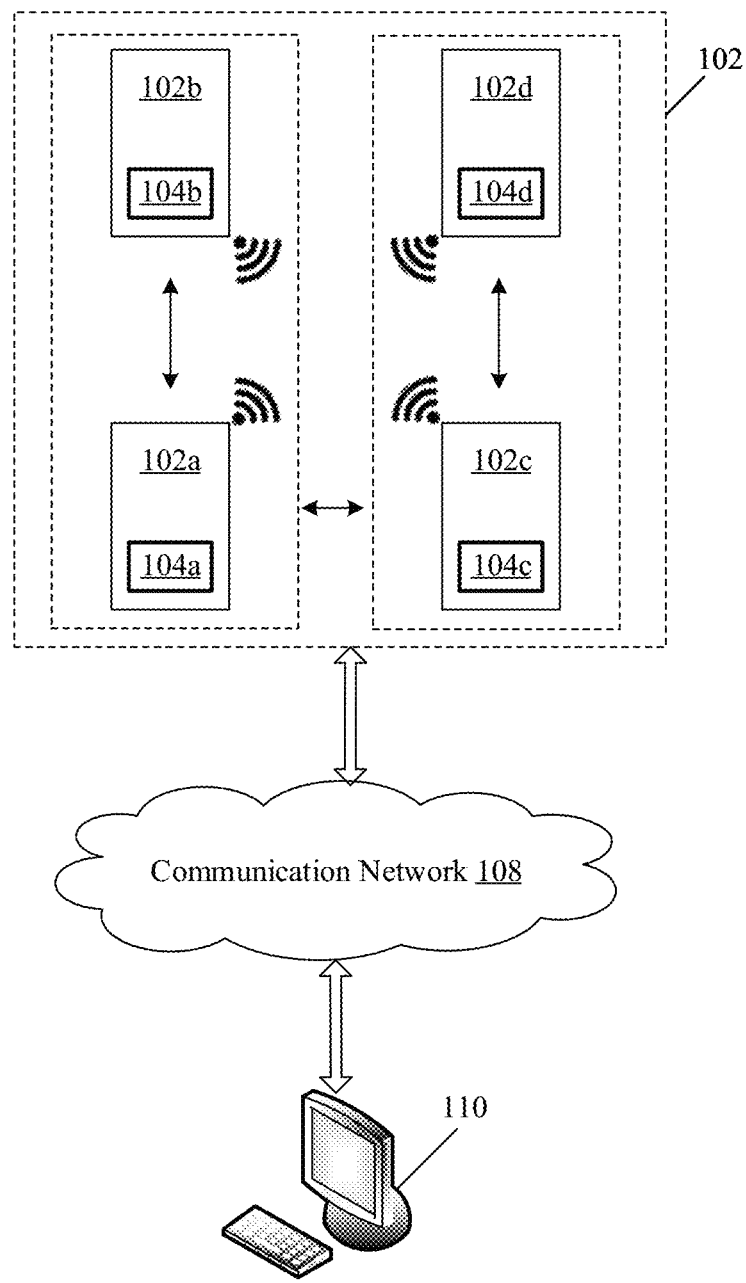
FIG. 4C is a block diagram that illustrates a third network environment that includes a plurality of UAVs and/or a server for reconstruction of 3D structure in a clustered processing mode, in accordance with an embodiment of the disclosure.

FIG. 4C illustrates a third network environment that includes a plurality of UAVs and/or a server for 3D structure reconstruction in a clustered processing mode, in accordance with an embodiment of the disclosure. FIG. 4C is described in conjunction with elements of FIGS. 1, 2, and 3. With reference to FIG. 4C, there is the plurality of UAVs 102 and the user terminal 110 that communicate with each other, via the communication network 108.

In operation, the clustered processing mode may be implemented based on one or more system components installed in each of the plurality of UAVs 102, such as the first UAV 102a. The one or more system components may include: a communication manager, a UAV monitor, a resource allocation manager, a resource negotiator, and a resource migration manager. The communication manager, in conjunction with the UAV monitor, may determine communication dependency ratio for each UAV with respect to the one or more other UAVs of the plurality of UAVs 102. In accordance with an embodiment, the communication dependency ratio for the first UAV 102a with respect to the second UAV 102b may exceed a predetermined threshold value. Similarly, the communication dependency ratio for the third UAV 102c with respect to the fourth UAV 102d may also exceed a predetermined threshold value. Accordingly, a first cluster 402 that includes the first UAV 102a and the second UAV 102b, and a second cluster 404 that includes the third UAV 102c and the fourth UAV 102d, may be formed. The formation of the first cluster 402 and the second cluster 404 may be further based on the proximity parameter to reduce the communication cost. In accordance with an embodiment, the first UAV 102a and the third UAV 102c may be dynamically determined to be the master UAVs in the first cluster 402 and the second cluster 404, respectively. Such a dynamic determination may be based on status information of the one or more computational resources of the UAV monitors of the corresponding UAVs. In accordance with an embodiment, the first UAV 102a and the third UAV 102c may be pre-determined to be the master UAVs in the first cluster 402 and the second cluster 404, respectively. A person of ordinary skill in the art will understand that the communication of the determination of the first UAV 102a and the third UAV 102c as master UAVs has been described for exemplary purpose, which may not be construed to limit the disclosure. Notwithstanding, the disclosure may not be limited to the configuration of the first UAV 102a and the third UAV 102c to be pre-programmed as master devices or controllers. Others of the plurality of UAVs 102 with sufficient computational resources may be configured or programmed as the master devices or controllers, without deviation from the scope of the disclosure.

The user terminal 110 may be configured to communicate the received user input to more than one UAV of the plurality of UAVs 102, such as the first UAV 102a and the third UAV 102c. In accordance with an embodiment, based on the user input, the first UAV 102a in the first cluster 402 may be configured to receive information from the second UAV 102b. Similarly, the third UAV 102c in the second cluster 404 may be configured to receive information from the fourth UAV 102d. The information may comprise focal lens information, current location and current orientation of the second imaging device 104b and the fourth imaging device 104d associated with the second UAV 102b and the fourth UAV 102d, respectively. The information may be determined by the second UAV 102b and the fourth UAV 102d, as described in FIG. 1.

In accordance with an embodiment, the first UAV 102a in the first cluster 402 may be configured to determine calibration information of the second imaging device 104b. Similarly, the third UAV 102c in the second cluster 404 may be configured to determine calibration information of the fourth imaging device 104d. The first UAV 102a and the third UAV 102c may be configured to communicate the determined calibration information to the second imaging device 104b and the fourth imaging device 104d, respectively.

The calibration of the second imaging device 104b and the fourth imaging device 104d may be performed by the second UAV 102b and the fourth UAV 102d. The calibration may be performed to adjust one or more intrinsic and/or extrinsic parameters of the second imaging device 104b and the fourth imaging device 104d, as described in FIG. 1.

In accordance with an embodiment, the first UAV 102a in the first cluster 402 may be configured to determine a target location and a target orientation of the second imaging device 104b. Similarly, the third UAV 102c in the second cluster 404 may be configured to determine a target location and a target orientation of the fourth imaging device 104d. The first UAV 102a and the third UAV 102c may be configured to determine their target location and target orientation, in accordance with a triangulation technique in respective clusters.

In accordance with an embodiment, the first UAV 102a in the first cluster 402 may be configured to communicate control information to the second UAV 102b. Similarly, the third UAV 102c in the second cluster 404 may be configured to communicate control information to the fourth UAV 102d. Based on the received control information, the second UAV 102b and the fourth UAV 102d may modify the current location and the current orientation of the second imaging device 104b and the fourth imaging device 104d, respectively. The current location and the current orientation of the second imaging device 104b and the fourth imaging device 104d may be modified to the determined target location and the determined target orientation. In accordance with an embodiment, the first UAV 102a and the third UAV 102c may be configured to modify its current location and the current orientation to the target location and the target orientation, determined via the triangulation technique.

Once the plurality of UAVs 102 modify their current locations and the current orientations to the target locations and target orientations, the plurality of imaging devices 104 may capture a plurality of images of the one or more static and/or moving objects. The plurality of images may be captured by the plurality of imaging devices 104 in different clusters. A first plurality of images may include images captured by the first imaging device 104a of the first UAV 102a and the second imaging device 104b of the second UAV 102b in the first cluster 402. A second plurality of images may include images captured by the third imaging device 104c of the third UAV 102c and the fourth imaging device 104d of the fourth UAV 102d in the second cluster 404. The first plurality of images may be dynamically synchronized with the second plurality of images, based on synchronization signals communicated between the first UAV 102a and the third UAV 102c, as explained in FIG. 1.

Based on the first plurality of images, the first UAV 102a may be further configured to perform a real-time reconstruction of 3D structure of the selected one or more static and/or moving objects. Similarly, the third UAV 102c may be configured to perform a real-time reconstruction of 3D structure of the selected one or more static and/or moving objects, based on the second plurality of images. In each of the clusters, the UAV monitor of each of the plurality of UAVs 102 may periodically check state variables of the corresponding UAV to determine the status information of the one or more computational resources. The resource allocation manager, in conjunction with the UAV monitor, may dynamically distribute one or more computational resources within the clusters in case the UAVs are overloaded. The resource negotiator may negotiate one or more computational resources of the second UAV 102b and the fourth UAV 102d to the first UAV 102a and the third UAV 102c in respective clusters. The resource migration manager may virtually migrate one or more computational resources from the second UAV 102b and the fourth UAV 102d to the first UAV 102a and the third UAV 102c in respective clusters.

The reconstruction of the two 3D structures may be performed by the first UAV 102a and the third UAV 102c, based on 3D scene interpretation and/or point cloud generation for the selected one or more static and/or moving objects, as explained in FIG. 3. In accordance with an embodiment, the first UAV 102a and the third UAV 102c may be further configured to communicate the two reconstructed 3D structures from the first plurality of images and the second plurality of images to the user terminal 110, via the communication network 108. Thus, in such a case, the user terminal 110 may receive the two reconstructed 3D structures for display.

FIGS. 5A to 5D, collectively, illustrate an exemplary triangulation technique to determine a location of an exemplary UAV, in accordance with an embodiment of the disclosure. FIGS. 5A to 5D are described in conjunction with elements of FIGS. 1, 2, and 3. With reference to FIGS. 5A to 5D, there is shown at least the first UAV 102a, the second UAV 102b, and the third UAV 102c. The exemplary triangulation technique may be applied to determine position and orientation of one or all of the first UAV 102a, the second UAV 102b, and the third UAV 102c. There is further shown one or more static or moving objects, such as a soccer player 502.

Conventionally, the position of the first UAV 102a, the second UAV 102b, and the third UAV 102c may be determined based on the GPS sensor data. However, a significant random error may be introduced when the position of the first UAV 102a, the second UAV 102b, or the third UAV 102c is determined based on the GPS sensor data. In order to overcome such significant random errors, the exemplary triangulation technique to determine a location of the first UAV 102a.

Figure 5A:
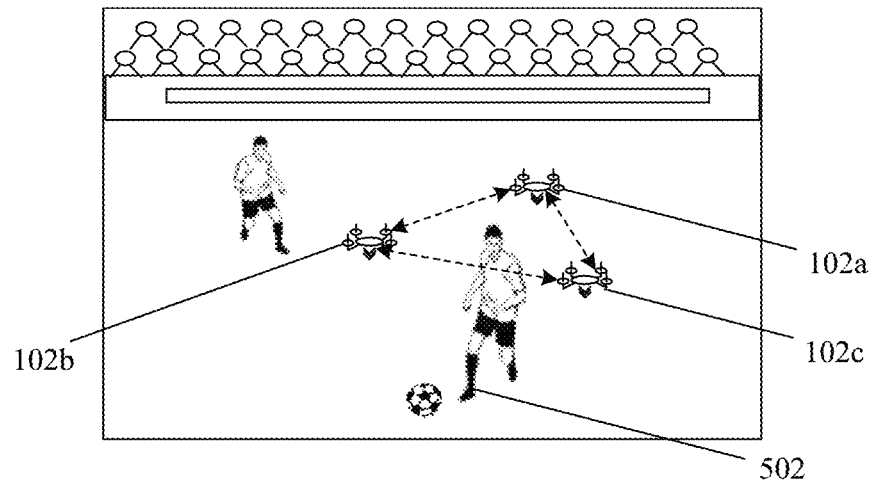
FIGS. 5A to 5D, collectively, illustrate an exemplary triangulation technique to determine a location of an exemplary UAV, in accordance with an embodiment of the disclosure.

In operation, at a specific time instance, the first UAV 102a, the second UAV 102b, and the third UAV 102c may be air-borne with respect to the soccer player 502, as shown in FIG. 5A. The first UAV 102a, the second UAV 102b, and the third UAV 102c may be associated with respective current locations and current orientations. Accordingly, the distances between the first UAV 102a, the second UAV 102b, and the third UAV 102c may be determined, by various distance determination techniques known in the art. For example, radio frequency (RF) signals may be utilized for such distance determination as each of the first UAV 102a, the second UAV 102b, and the third UAV 102c comprises a transceiver. The transceiver may be capable to transmit and receive RF signals.

Figure 5B:
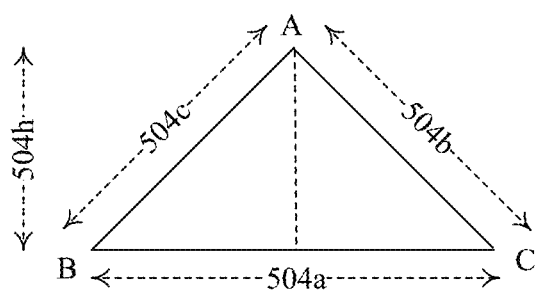
Figure 5C:
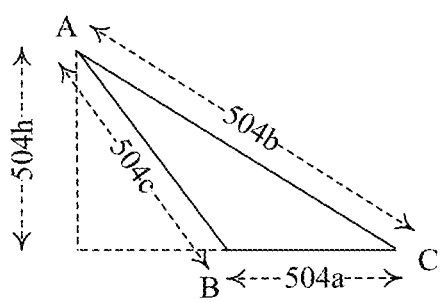
Figure 5D:
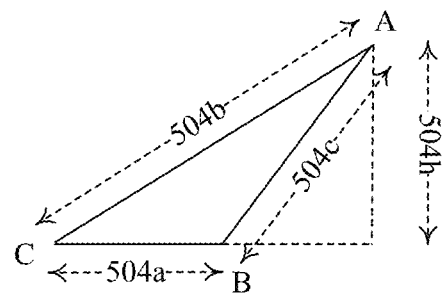

In accordance with the exemplary scenario, as shown in FIG. 5A, a first distance, "a", may be determined between the second UAV 102b and the third UAV 102c. A second distance, "b", may be determined between the first UAV 102a and the third UAV 102c. A third distance, "c", may be determined between the first UAV 102a and the second UAV 102b. Thus, a triangle may be formed with vertices "A", "B", and "C", that correspond to the first UAV 102a, the second UAV 102b, and the third UAV 102c, respectively, as shown in FIG. 5B. Further, two more possible arrangements have been shown in FIGS. 5C and 5D. The position of the vertices "A", "B", and "C", may be determined based on a sequence of mathematical expressions. An area of the triangle may be calculated, based on mathematical expression (1), as follows:

$$\text{Area} = \sqrt{s*(s-a)*(s-b)*(s-c)} \tag{1}$$

where "area" is the area of the triangle, illustrated in FIG. 5B.

"s" is the semi-parameter of the triangle, computed as (a+b+c)/2.

Based on the calculated area, height of the triangle may be calculated, based on mathematical expression (2), as follows:

$$H = 2*\text{Area}/\text{baselength} \tag{2}$$

where "H" is the height of the triangle, illustrated in FIG. 5B.

Based on the calculated height of the triangle, interior angles may be calculated, based on mathematical expressions (3) and (4), as follows:

$$\text{angle}(c) = \sin^{-1}(\text{height}/b) \tag{3}$$

$$\text{angle}(b) = \sin^{-1}(\text{height}/c) \tag{4}$$

where "angle (c)" and "angle (b)" are the interior angles at vertices "B" and "C" obtained using the arc sine formulas.

Further, the base of the triangle may form an angle with the x-axis, which may be calculated based on arc cosine of dot product of unit vector of the base and the unit vector of the x-axis. All the vertices, "A", "B", and "C", may be rotated by the angle to obtain rotated points, based on mathematical expression (5), as follows:

$$\begin{bmatrix} \cos\theta & -\sin\theta & 0 \\ \sin\theta & \cos\theta & 0 \\ 0 & 0 & 1 \end{bmatrix} \begin{bmatrix} x \\ y \\ z \end{bmatrix} \quad (5)$$

where "θ" is the angle of rotation.

Before rotation of all the points around vertex "B", the points may be translated by a distance equal to a distance of the vertex "B" from the origin. After rotation, all the points may be translated back by the same distance to make it look as if the points were rotated about vertex "B". The translation equation may be based on mathematical expression (6), as follows:

$$\begin{bmatrix} 1 & 0 & 1_x \\ C & 1 & 1_y \\ C & 0 & 1 \end{bmatrix} \quad (6)$$

Accordingly, the equation for the vertex "C" in two dimensions, may be represented by mathematical expressions (7) and (8), as follows:

$$Cx = \cos\theta(Cx - Bx) - \sin\theta(Cy - By) + Bx \quad (7)$$

$$Cy = \sin\theta(Cx - Bx) + \cos\theta(Cy - By) + By \quad (8)$$

where "Cx" is the x-coordinate of the vertex "C";
"Cy" is y-coordinate of the vertex "C"; and
"θ" is the angle of rotation.

It may be checked if the angle at vertex "C" is acute or obtuse. When the angle is acute, then the position of vertex "A" may be represented by mathematical expressions (9) and (10), as follows:

$$A.x = C.x - b^*\cos(\text{angle at vertex } C) \quad (9)$$

$$A.y = C.y + b^*\sin(\text{angle at vertex } C) \quad (10)$$

When the angle is obtuse, then the position of the vertex "A" may be represented by mathematical expressions (11) and (12), as follows:

$$A.x = B.x + c^*\cos(\text{angle at vertex } B) \quad (11)$$

$$A.y = B.y + c^*\sin(\text{angle at vertex } B) \quad (12)$$

Finally, all the points may be rotated back by negative of the angle "θ" to obtain the final position of the vertex "A". Similarly, the orientation of the first UAV 102a, the second UAV 102b, and the third UAV 102c may be determined based on a vector that connects the head and the tail of a UAV, such as the first UAV 102a, represented by mathematical expression (13), as follows:

$$\text{Magnitude} = \sqrt{\text{Vector}.x^2 + \text{Vector}.y^2} \quad (13)$$

where "Vector.x"=tail.x−head.x of the x-coordinate of the first UAV 102a; and "Vector.y"=tail.y−head.y of the y-coordinate of the first UAV 102a.

Accordingly, the unit vector components may be calculated, based on mathematical expressions (14) and (15), as follows:

$$\text{Unit Vector}.x = \text{Vector}.x/\text{Magnitude} \quad (14)$$

$$\text{Unit Vector}.y = \text{Vector}.y/\text{Magnitude} \quad (15)$$

To obtain an angle that the vector forms with the y-axis, a dot product of the unit vector with the unit vector representing the y-axis may be calculated. An arc cosine of the dot product may be calculated, which calculates the orientation angle of the head with respect to the y-axis, based on mathematical expression (16), as follows:

$$-\theta = \cos^{-1}(\text{dot product}) \quad (16)$$

If the angle "θ" is calculated in the counter clockwise direction, then the angle "θ" may be subtracted from 360 degrees. This may determine the orientation of the head of the first UAV 102a from the y-axis. To determine the orientation of the tail of the first UAV 102a with respect to the y-axis, the angle "θ" may be subtracted from 180 degrees. If the angle "θ" is less than 0 degrees, then 360 degrees may be added to the angle "θ" to indicate the final orientation of the tail of the first UAV 102a with respect to the y-axis.

Figure 6A:
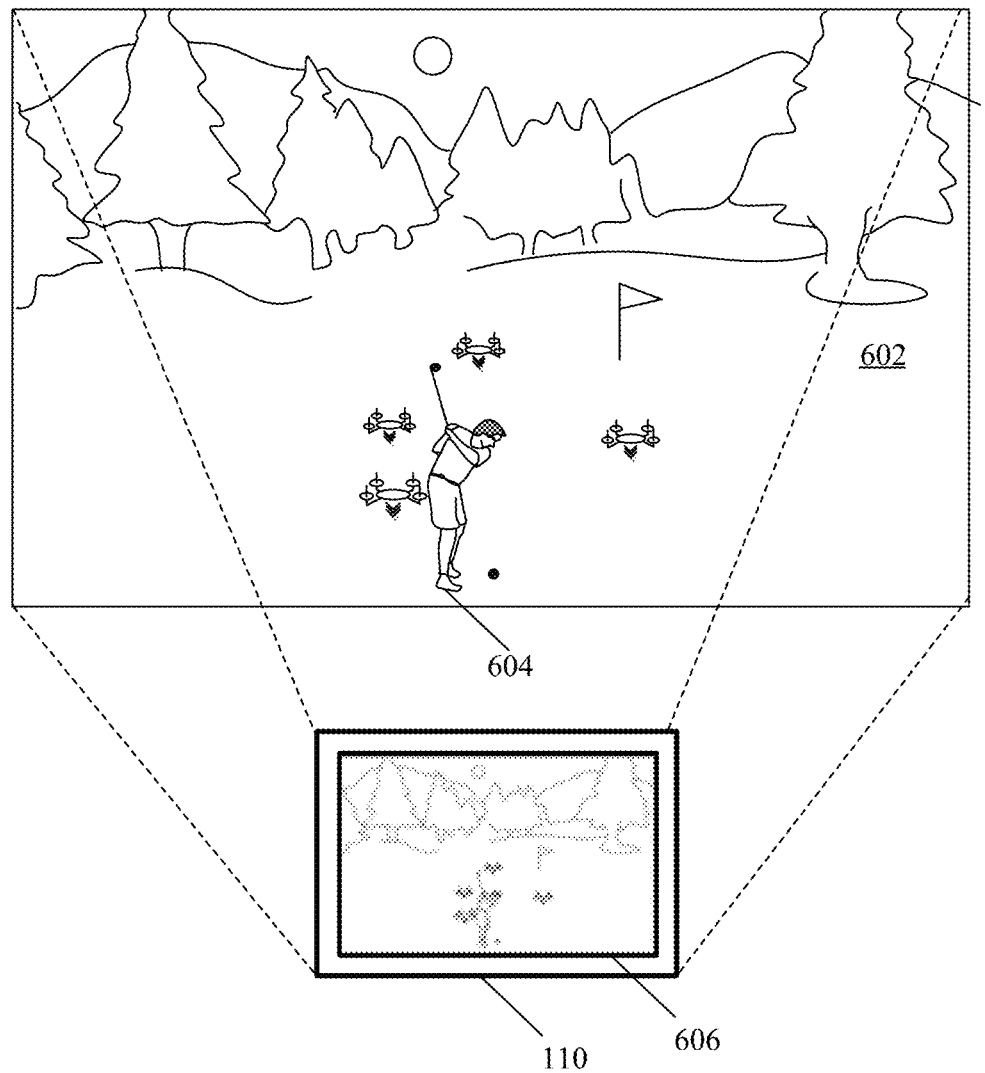
FIGS. 6A to 6C collectively illustrate an exemplary scenario for implementation of an exemplary method for image processing, in accordance with an embodiment of the disclosure.
Figure 6B:
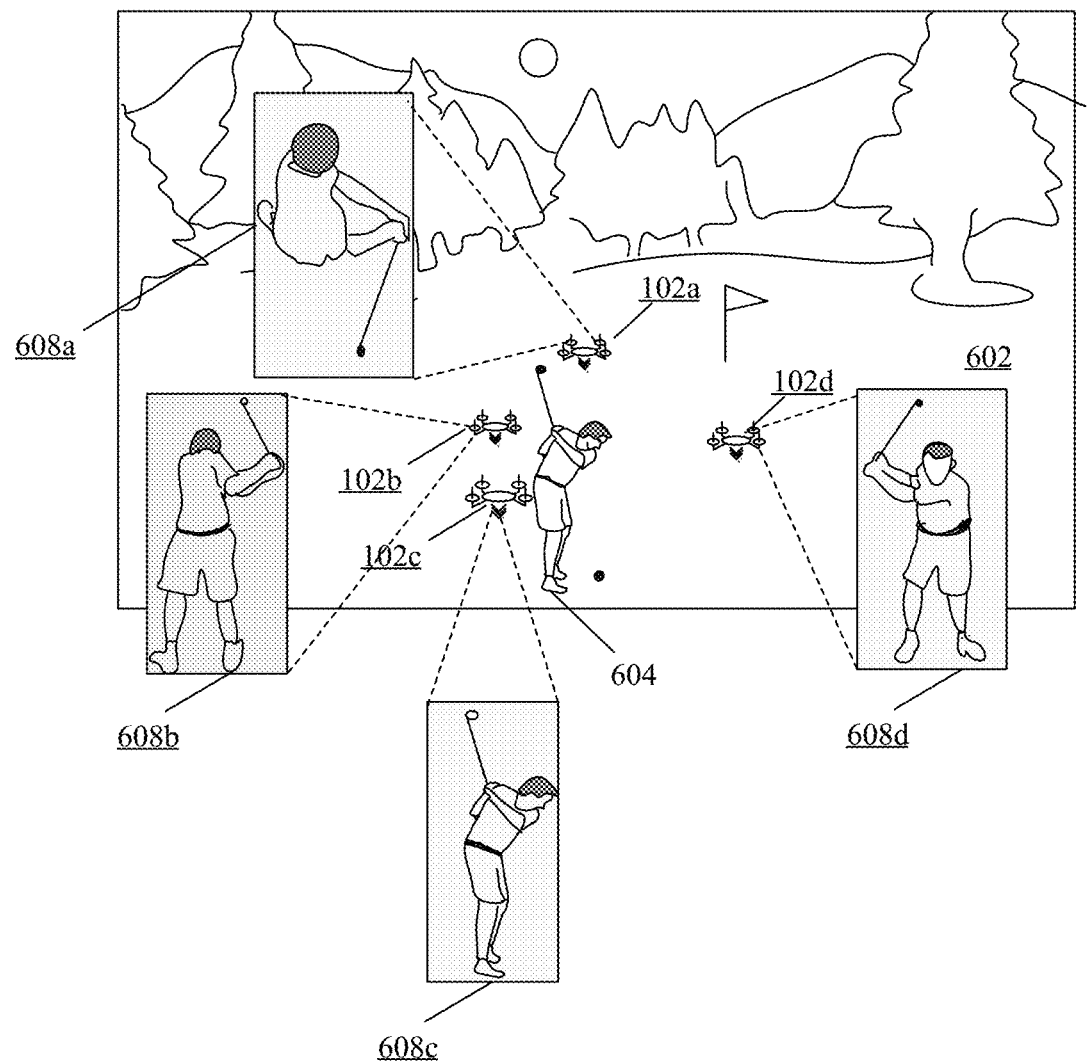
Figure 6C:
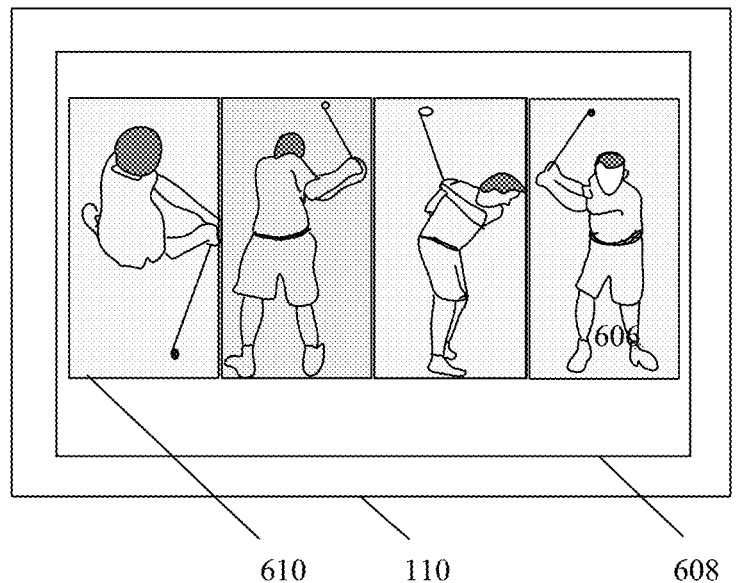

FIGS. 6A to 6C collectively illustrate an exemplary scenario for implementation of an exemplary method for image processing, in accordance with an embodiment of the disclosure. FIGS. 6A to 6C are described in conjunction with elements of FIGS. 1 to 5D. With reference to FIGS. 6A to 6C, there is shown an exemplary scenario of a golf tournament being played in a golf field 602 where a golf player 604 is playing a shot. There is shown, at a user interface 606 of the user terminal 110, a live video stream of the golf tournament captured by an exemplary image capturing device (not shown). There are further shown the plurality of UAVs 102 in the golf field 602.

With reference to FIG. 6A, as described in FIG. 1, each of the plurality of UAVs 102 may perform a pre-flight diagnostic process to monitor system controls and state variables associated with the plurality of UAVs 102. Once the pre-flight diagnostic process is successful, the plurality of UAVs 102 may initiate the flight and become air-borne. Thereafter, the plurality of UAVs 102, which is now air-borne, may perform in-flight diagnostic process to periodically monitor respective system controls and state variables.

The plurality of UAVs 102 may be configured to communicate with each other, via the communication network 108 (such as Wi-Fi), in accordance with a pre-programmed flight plan. One of the plurality of UAVs 102, such as the first UAV 102a, may be pre-configured as a master device to centrally monitor system controls and state variables of the one or more other UAVs 102b to 102d. The first UAV 102a may be configured to monitor and record system controls and state variables of the one or more other UAVs 102b to 102d. Accordingly, the first UAV 102a may generate a state variable table that may store and periodically update the state variables of the one or more other UAVs 102b to 102d.

In an example, the first UAV 102a may automatically select the golf player 604 as a salient object in the golf field 602. In another example, a user, such as a sports analyst, may provide a touch-based input at the user interface 606 of the user terminal 110 to select the golf player 604. In such a case, the user terminal 110 may be configured to communicate the received user input to the first UAV 102a.

In response to the receipt of the user input, the first UAV 102a may be configured to receive information from the one or more other UAVs 102b to 102d. The information may comprise focal lens information, current location and current orientation of the one or more imaging devices 104b to 104d associated with the one or more other UAVs 102b to 102d. The first UAV 102a may be further configured to determine a current location of the golf player 604 in the golf field 602.

In accordance with an embodiment, the first UAV 102a may be configured to determine calibration information of the one or more other UAVs 102b to 102d, based on the received focal lens information and a plurality of images of a common pre-determined calibration object, as explained in FIG. 1. The first UAV 102*a* may be configured to communicate the determined calibration information to the one or more imaging devices 104*b* to 104*d*, associated with the one or more other UAVs 102*b* to 102*d*. Accordingly, calibration of the one or more imaging devices 104*b* to 104*d*, may be performed by the respective one or more other UAVs 102*b* to 102*d*. The calibration of the one or more imaging devices 104*b* to 104*d* may be performed by the one or more other UAVs 102*b* to 102*d* to adjust one or more intrinsic and/or extrinsic parameters of the one or more imaging devices 104 *b* to 104*d*.

In accordance with an embodiment, the first UAV 102*a* may be configured to determine a target location and a target orientation of the one or more imaging devices 104*b* to 104*d*. The target location and a target orientation may be determined based on the received focal lens information, the received current location, the received current orientation, and the current location of the selected one or more static or moving objects. The first UAV 102*a* may be configured to determine its target location and target orientation, in accordance with a triangulation technique, as explained in FIGS. 5A to 5D.

In accordance with an embodiment, the first UAV 102*a* may be configured to communicate control information to the one or more other UAVs 102*b* to 102*d*. Based on the received control information, the one or more other UAVs 102*b* to 102*d* may modify the current location and the current orientation of the one or more imaging devices 104*b* to 104*d*. The current location and the current orientation of the one or more imaging devices 104*b* to 104*d* may be modified to the determined target location and the determined target orientation. In accordance with an embodiment, the first UAV 102*a* may be configured to modify its current location and the current orientation to the target location and the target orientation, determined via the triangulation technique.

Once the plurality of UAVs 102 modify their current locations and the current orientations to the target locations and target orientations, the plurality of imaging devices 104 may capture a set of images 608 of the golf player 604, as shown in FIG. 6B. For example, the first image 608*a* may be captured by the first imaging device 104*a* of the first UAV 102*a* and the second image 608*b* may be captured by the second imaging device 104*b* of the second UAV 102*b*. Similarly, the third image 608*c* may be captured by the third imaging device 104*c* of the third UAV 102*c* and the fourth image 608*d* may be captured by the fourth imaging device 104*d* of the fourth UAV 102*d*. The set of images 608 may be dynamically synchronized with each other, based on synchronization signals transmitted by the first UAV 102*a*.

The plurality of imaging devices 104 may be further configured to collaboratively capture motion information associated with the selected golf player 604. The first UAV 102*a* may collate the set of images 608 and the motion information of the selected golf player 604. The first UAV 102*a* may be further configured to dynamically determine a distributed processing mode, based on which the set of images captured by the plurality of imaging devices 104 may be processed. The first UAV 102*a* may dynamically determine the distributed processing mode, based on the state of the computational resources retrieved from the state variable table, updated during the latest in-flight diagnostic process.

In accordance with an embodiment, based on the state of the computational resources, the first UAV 102*a* may determine that the first UAV 102*a* itself exhibits maximum computational bandwidth. However, the memory availability may not be sufficient with the first UAV 102*a*. In such a case, the message manager, in conjunction with the UAV monitor, of the first UAV 102*a* may determine that the communication dependency ratio for the first UAV 102*a* with respect to the one or more other UAVs 102*b* to 102*d* exceed a predetermined threshold value. Thus, the resource allocation managers of the one or more other UAVs 102*b* to 102*d* may dynamically distribute memory spaces to the first UAV 102*a*. The resource negotiators of the plurality of UAVs 102 may negotiate the memory spaces for image processing. The resource migration managers of the one or more other UAVs 102*b* to 102*d* may virtually migrate the memory spaces to the first UAV 102*a*.

The first UAV 102*a* may be configured to reconstruct a real-time 3D structure of the selected golf player 604, based on the set of images 608, as shown in FIG. 6C. Such reconstruction of the real-time 3D structure 610 may be performed by the first UAV 102*a*, based on the local and virtually migrated computational resources. The reconstruction of the 3D structure 610 may be performed by the first UAV 102*a*, based on 3D scene interpretation and/or point cloud generation for the golf player 604, as explained in FIG. 3.

In accordance with an embodiment, the first UAV 102*a* may be further configured to communicate the reconstructed 3D structure 610 to the user terminal 110, via the communication network 108. Thus, in such a case, the user terminal 110 may receive the reconstructed 3D structure 610 for display. In accordance with an embodiment, the user terminal 110 may be further operable to receive another user input to modify the viewpoint of the reconstructed 3D structure 610. A request that corresponds to the modified viewpoint may be communicated back to the first UAV 102*a*. Based on the request, the first UAV 102*a* may again determine a new target location and target orientation of the one or more other UAVs 102*b* to 102*d*, respectively. The first UAV 102*a* may receive a new set of images from the one or more other UAVs 102*b* to 102*d* UAVs, in a similar manner as described above. Reconstruction of the 3D structure may be again performed, and communicated to the user terminal 110, via the communication network 108, in a similar manner as described above.

Figure 7A:
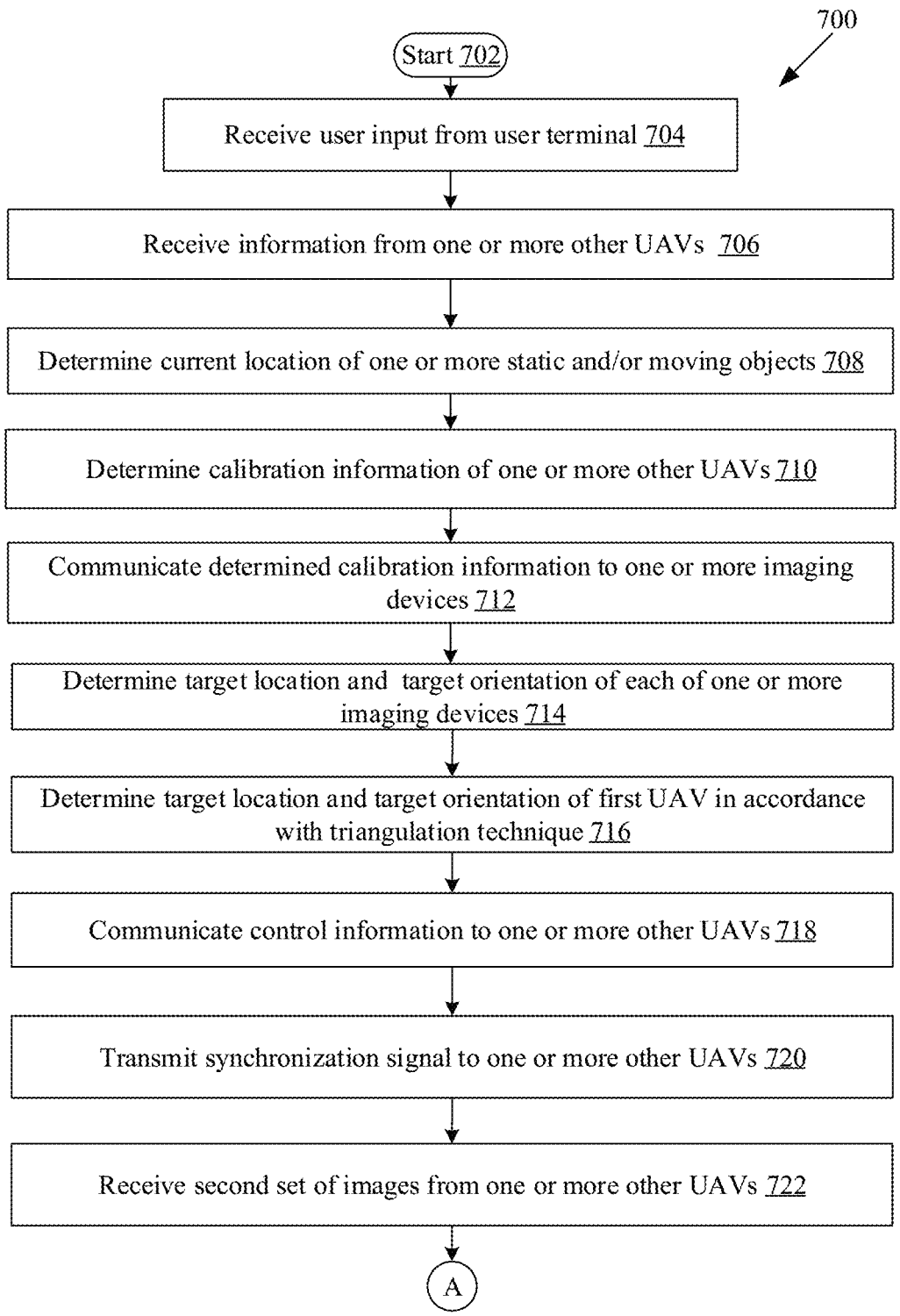
FIGS. 7A and 7B collectively illustrate a first flow chart for implementation of an exemplary method for image processing, in accordance with an embodiment of the disclosure.
Figure 7B:
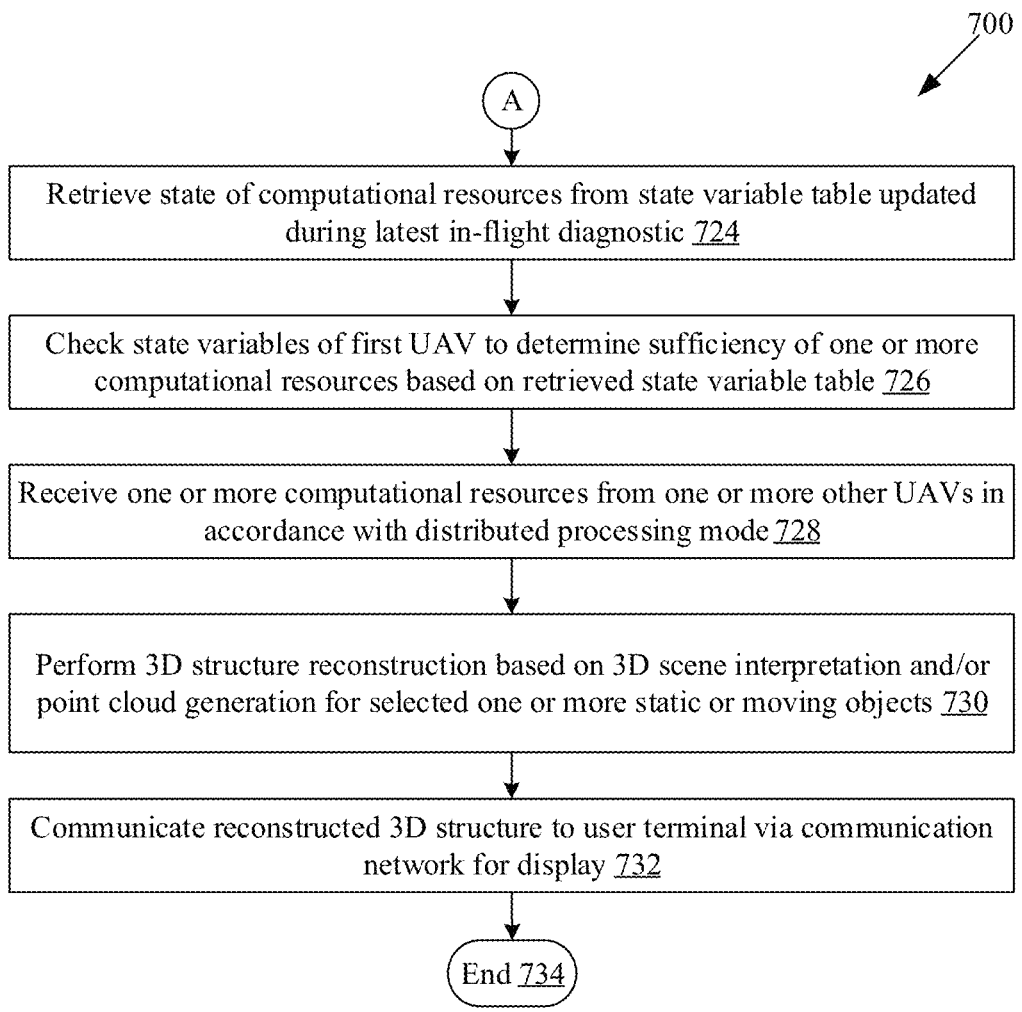

FIGS. 7A and 7B collectively illustrate a first flow chart for implementation of an exemplary method for image processing, in accordance with an embodiment of the disclosure. FIGS. 7A and 7B are described in conjunction with elements of FIGS. 1 to 5D. The method, in accordance with a flowchart 700 in FIGS. 7A and 7B may be implemented in the first UAV 102*a* of the plurality of UAVs 102, in accordance with a distributed processing mode. The method starts at step 702 and proceeds to step 704.

At step 704, a user input may be received from a user terminal, such as the user terminal 110. At step 706, in response to the received user input, information from the one or more other UAVs 102*b* to 102*d* may be received, via wireless communication channels, such as Wi-Fi. The information may comprise focal lens information, current location and current orientation of the one or more imaging devices 104*b* to 104*d* associated with the one or more other UAVs 102*b* to 102*d*. The information may be determined by the one or more other UAVs 102*b* to 102*d*, based on a first set of sensors, such as gyroscopes, installed therein. The information may be refined by the one or more other UAVs 102*b* to 102*d*, based on a second set of sensors, such as image sensors, installed therein. At step 708, a current location of the selected one or more static and/or moving objects may be determined.

At step 710, calibration information of the one or more other UAVs 102b to 102d may be determined, based on the received focal lens information and a plurality of images of a common pre-determined calibration object. At step 712, the determined calibration information may be communicated to the one or more imaging devices 104b to 104d, associated with the one or more other UAVs 102b to 102d. Accordingly, calibration of the one or more imaging devices 104b to 104d, may be performed by the respective one or more other UAVs 102b to 102d to adjust one or more intrinsic and/or extrinsic parameters of the one or more imaging devices 104 b to 104d.

At step 714, a target location and a target orientation of each of the one or more imaging devices 104b to 104d may be determined. The target location and a target orientation may be determined based on the received focal lens information, the received current location, the received current orientation, and the current location of the selected one or more static and/or moving objects. At step 716, a target location and target orientation of the first UAV 102a, in accordance with the triangulation technique, as explained in FIGS. 5A to 5D, may be determined. The target locations and the target orientations of the plurality of imaging devices 104 may correspond to an optimal arrangement of the plurality of imaging devices 104 around the selected one or more static and/or moving objects. The optimal arrangement of the plurality of UAVs 102 corresponds to maximal coverage of a 3D scene structure that includes the selected one or more static and/or moving objects at a pre-determined resolution of the plurality of imaging devices 104.

At step 718, control information may be communicated to the one or more other UAVs 102b to 102d. Based on the received control information, the one or more other UAVs 102b to 102d may modify the current location and the current orientation of the one or more imaging devices 104b to 104d. The current location and the current orientation of the one or more imaging devices 104b to 104d may be modified to the determined target location and the determined target orientation. Further, the current location and the current orientation of the first UAV 102a may be modified to the target location and the target orientation, determined via the triangulation technique.

At step 720, a synchronization signal may be transmitted to the one or more other UAVs 102b to 102d. At step 722, a first set of images may be captured by the first imaging device 104a. Further, a second set of images may be captured by the one or more imaging devices 104b to 104d of the one or more other UAVs 102b to 102d, respectively. Further, the one or more other UAVs 102b to 102d may collaboratively capture motion information associated with the selected one or more static and/or moving objects.

At step 722, the second set of images may be received from the one or more other UAVs 102b to 102d. At step 724, state of the computational resources may be retrieved from the state variable table, updated during the latest in-flight diagnostic process. The computational resources may correspond to the computational bandwidth, the memory availability, and/or the battery level of the plurality of the UAVs 102.

At step 726, the UAV monitor may check state variables of the first UAV 102a to determine sufficiency of the one or more computational resources based on the retrieved state variable table. In an instance, it may be determined that the one or more computational resources are sufficient. In such a case, the control may be passed to step 730. In an instance, it may be determined that the one or more computational resources are insufficient. In such a case, the control may be passed to step 728.

At step 728, one or more computational resources may be virtually received from the one or more other UAVs 102b to 102d, in accordance with the distributed processing mode. At step 730, a 3D structure reconstruction may be performed, based on 3D scene interpretation and/or point cloud generation for the selected one or more static or moving objects, as explained in FIG. 3. At step 732, the reconstructed 3D structure may be communicated to the user terminal 110, via the communication network 108, for display. Control passes to end step 734.

Figure 8:
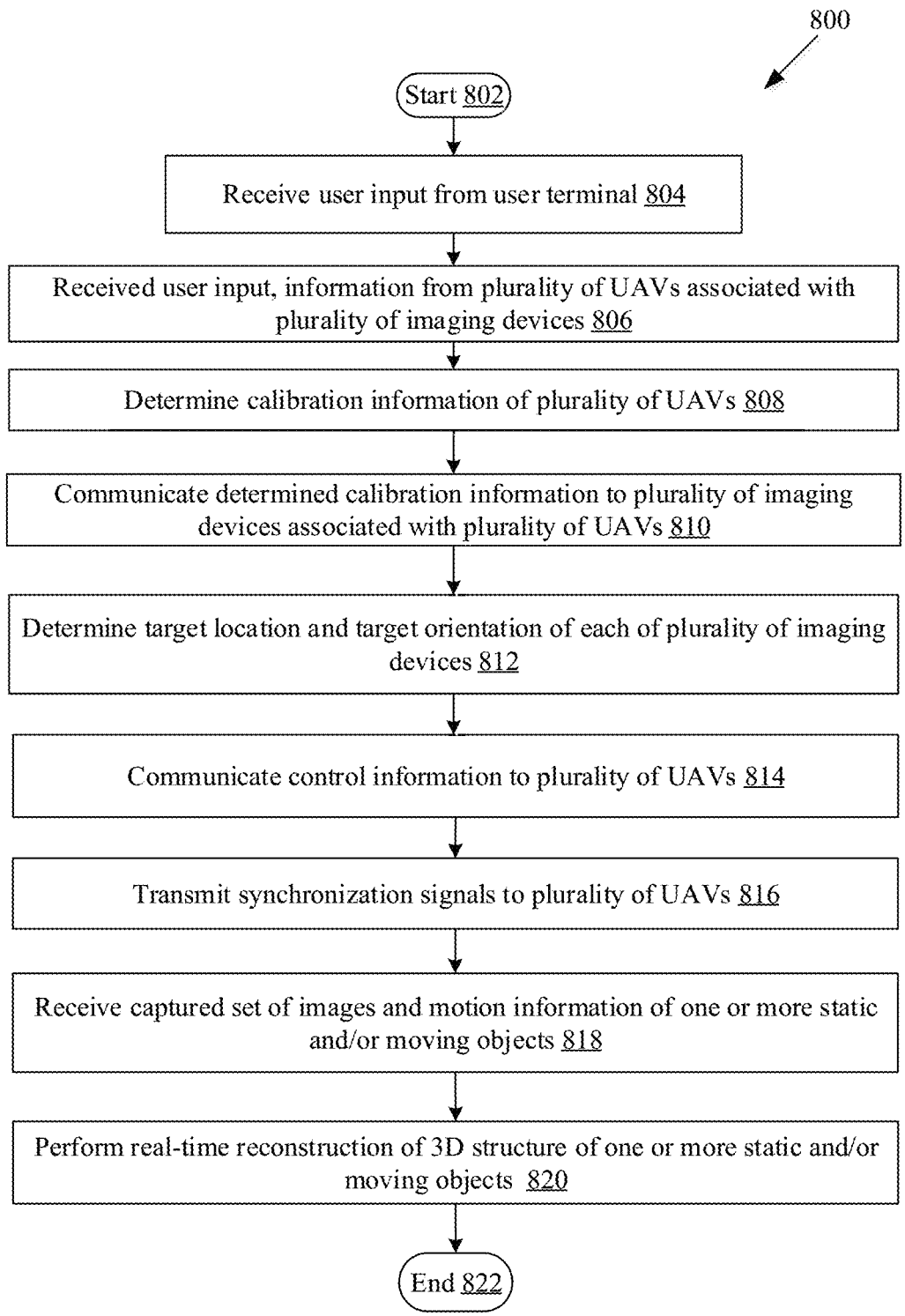
FIG. 8 illustrates a second flow chart for implementation of an exemplary method for image processing, in accordance with an embodiment of the disclosure.

FIG. 8 illustrates a second flow chart for implementation of an exemplary method for image processing, in accordance with an embodiment of the disclosure. FIG. 8 is described in conjunction with elements of FIGS. 1 to 5D. The method, in accordance with a flowchart 800 in FIG. 8 may be implemented in the server 106, in accordance with a centralized processing mode. The method starts at step 802 and proceeds to step 804.

At step 804, a user input may be received from the user terminal 110. At step 806, in response to the user input, information may be received from the plurality of UAVs 102 associated with the plurality of imaging devices 104. In such a case, the plurality of UAVs 102 and the server 106 may be in a mesh network, via a wireless communication channel, such as Wi-Fi. The information may comprise focal lens information, current location and current orientation of the plurality of UAVs 102 associated with the plurality of imaging devices 104, as explained in FIG. 4B.

At step 808, calibration information of the plurality of UAVs 102 may be determined, based on the received focal lens information and a plurality of images of a common pre-determined calibration object. At step 810, the determined calibration information may be communicated to the plurality of imaging devices 104 associated with the plurality of UAVs 102. Accordingly, calibration of the plurality of imaging devices 104 may be performed by the respective UAVs from the plurality of UAVs 102. As explained in FIG. 1, the calibration of the plurality of imaging devices 104 may be performed by the plurality of UAVs 102 to adjust one or more intrinsic and/or extrinsic parameters of the plurality of imaging devices 104.

At step 812, a target location and a target orientation of each of the plurality of imaging devices 104 may be determined. The target location and a target orientation may be determined based on the received focal lens information, the received current location, the received current orientation, and the current location of the selected one or more static and/or moving objects.

At step 814, control information may be communicated to the plurality of UAVs 102. Based on the control information, the plurality of UAVs 102 may modify the current location and the current orientation of the plurality of imaging devices 104. The current location and the current orientation of the plurality of imaging devices 104 may be modified to the determined target location and the determined target orientation.

At step 816, synchronization signals may be transmitted to the plurality of UAVs 102. Once the plurality of UAVs 102 modify their current locations and the current orientations to the target locations and target orientations, the plurality of imaging devices 104 may capture a set of images of the one or more static and/or moving objects, based on the synchronization signals. Each image in the set of images may be dynamically synchronized with respect to the other images, based on synchronization signals transmitted by the server 106. The plurality of imaging devices 104 may be further configured to collaboratively capture motion information associated with the selected one or more static and/or moving objects.

At step 818, the captured set of images and the motion information of the selected one or more static and/or moving objects may be received by the server 106. At step 820, a real-time reconstruction of 3D structure of the selected one or more static and/or moving objects may be performed, based on the received set of images, as explained in FIG. 4B. Control passes to end step 822.

Figure 9A:
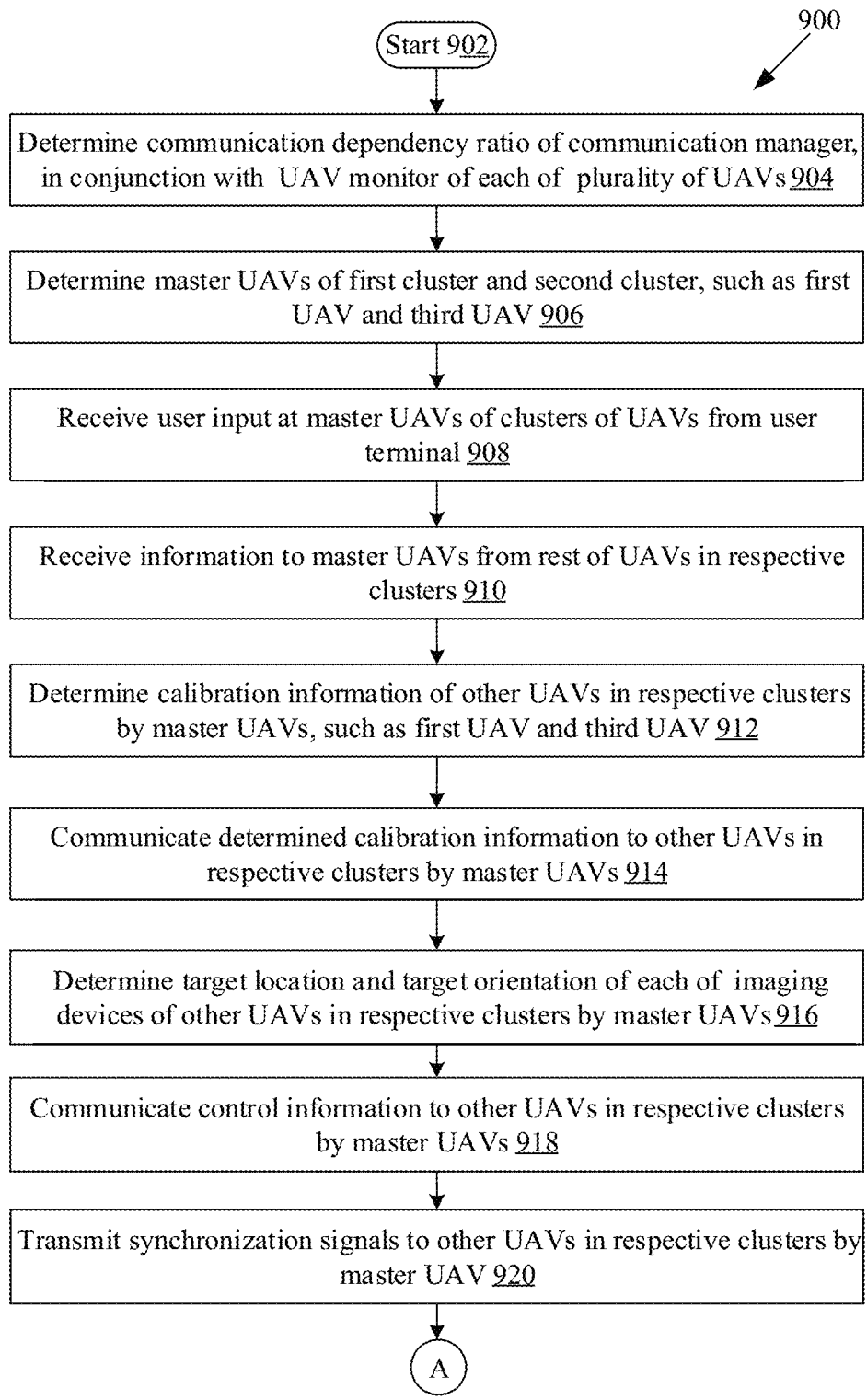
FIGS. 9A and 9B collectively illustrate a third flow chart for implementation of an exemplary method for image processing, in accordance with an embodiment of the disclosure.
Figure 9B:
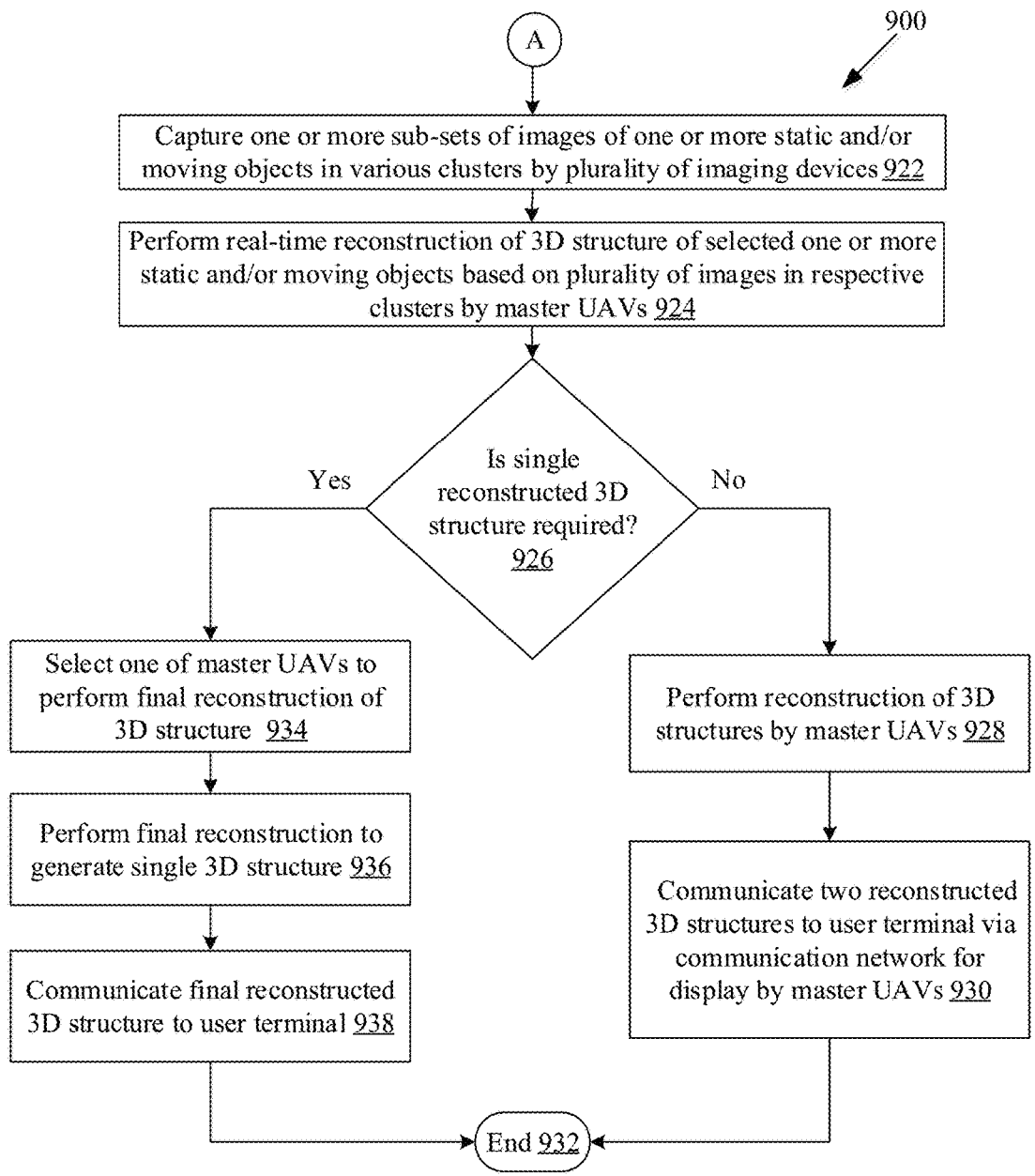

FIGS. 9A and 9B collectively illustrate a third flow chart for implementation of an exemplary method for image processing, in accordance with an embodiment of the disclosure. FIGS. 9A and 9B are described in conjunction with elements of FIGS. 1 to 5D. The method, in accordance with a flowchart 900 in FIGS. 9A and 9B may be implemented in the first UAV 102*a* and the third UAV 102*c*, in accordance with a clustered processing mode. The method starts at step 902 and proceeds to step 904.

At step 904, communication manager, in conjunction with the UAV monitor, of each of the plurality of UAVs 102 may determine communication dependency ratio. The communication dependency ratio of each of the plurality of UAVs 102 with respect to the other UAVs of the plurality of UAVs 102, may be determined to exceed a predetermined threshold value. Accordingly, clusters of UAVs, such as the first cluster 402 and the second cluster 404, may be formed. The formation of the clusters of UAVs may be further based on the proximity parameter to reduce the communication cost.

At step 906, for each cluster, such as the first cluster 402 and the second cluster 404, master UAVs, such as the first UAV 102*a* and the third UAV 102*c*, may be dynamically determined. Such a dynamic determination may be based on status information of the one or more computational resources by the UAV monitors of the corresponding UAVs. In an example, the first UAV 102*a* and the third UAV 102*c* may be pre-determined to be the master UAVs in the first cluster 402 and the second cluster 404, respectively.

At step 908, user input may be received at the master UAVs, (such as the first UAV 102*a* and the third UAV 102*c*) of the clusters of the UAVs (such as the first 402 and the second cluster 404) from the user terminal 110. At step 910, in response to the user input, the master UAVs may be configured to receive information from rest of the UAVs in the respective clusters. For example, the first UAV 102*a* in the first cluster 402 may be configured to receive information from the second UAV 102*b*. Similarly, the third UAV 102*c* in the second cluster 404 may be configured to receive information from the fourth UAV 102*d*. In such a case, the information may comprise focal lens information, current location and current orientation of the second imaging device 104*b* and the fourth imaging device 104*d* associated with the second UAV 102*b* and the fourth UAV 102*d*, respectively.

At step 912, the master UAVs, such as the first UAV 102*a* and the third UAV 102*c*, may be configured to determine calibration information of the other UAVs in respective clusters. At step 914, the master UAVs may be configured to communicate the determined calibration information to the other UAVs in respective clusters. Accordingly, the other UAVs may calibrate corresponding imaging devices in various clusters. The calibration may be performed to adjust one or more intrinsic and/or extrinsic parameters of the imaging devices, as described in FIG. 1.

At step 916, the master UAVs, in respective clusters, may be configured to determine a target location and a target orientation of each of the imaging devices of other UAVs in respective clusters. The master UAVs may be configured to determine their target location and target orientation, in accordance with a triangulation technique in respective clusters.

At step 918, the master UAVs may be configured to communicate control information to the other UAVs in respective clusters. Based on the received control information, the other UAVs may modify the current location and the current orientation of the associated imaging devices. The current location and the current orientation of the imaging devices may be modified to the determined target location and the determined target orientation. Further, the master UAVs may be configured to modify their current location and the current orientation to the target location and the target orientation, determined via the triangulation technique.

At step 920, the master UAVs may be configured to transmit synchronization signals to other UAVs in respective clusters. The synchronization signals may be further shared by the master UAVs. At step 922, the plurality of imaging devices 104 in the various clusters may capture a plurality of images of the one or more static and/or moving objects in the various clusters. For example, a first plurality of images may include images captured by the first imaging device 104*a* of the first UAV 102*a* and the second imaging device 104*b* of the second UAV 102*b* in the first cluster 402. A second plurality of images may include images captured by the third imaging device 104*c* of the third UAV 102*c* and the fourth imaging device 104*d* of the fourth UAV 102*d* in the second cluster 404. The first plurality of images may be dynamically synchronized with the second plurality of images, based on synchronization signals communicated between the first UAV 102*a* and the third UAV 102*c*, as explained in FIG. 1.

At step 924, the master UAVs may be configured to perform a real-time reconstruction of 3D structure of the selected one or more static and/or moving objects based on the plurality of images in respective clusters. In each of the clusters, the UAV monitor of each of the plurality of UAVs 102 may periodically check state variables of the corresponding UAV to determine the status information of the one or more computational resources. The resource allocation manager, in conjunction with the UAV monitor, may dynamically distribute one or more computational resources within the clusters in case the UAVs are overloaded. The resource negotiator may negotiate one or more computational resources of the other UAVs with the master UAVs, in respective clusters. The resource migration manager may virtually migrate one or more computational resources of the other UAVs to the master UAVs in respective clusters.

At step 926, it may be determined whether one or multiple reconstructed images are required. In an instance, when more than one reconstructed images are required, control passes to step 928. In an instance, when only one reconstructed image is required, control passes to step 934. At step 928, reconstruction of the 3D structures may be performed by the master UAVs, based on 3D scene interpretation and/or point cloud generation for the selected one or more static and/or moving objects, as explained in FIG. 3. At step 930, the master UAVs may be further configured to communicate the two reconstructed 3D structures to the user terminal 110, via the communication network 108, for display. Control passes to end step 932.

At step 934, based on the state control variables that indicate availability of the computational resources, one of the master UAVs may be selected to perform final reconstruction of a 3D structure. At step 936, a final reconstruction may be performed to generate a single 3D structure. At step 938, the final reconstructed 3D structure may be communicated to the user terminal 110. Control passes to end step 932.

In accordance with an embodiment of the disclosure, a system for image processing may comprise the plurality of UAVs 102. The plurality of UAVs may be associated with the plurality of imaging devices 104. The first UAV 102a of the plurality of UAVs 102 may comprise the first imaging device 104a that may capture a first set of images of one or more static and/or moving objects. The first UAV 102a may further comprise the processor 202 that may receive focal lens information, current location and current orientation of the one or more imaging devices 104b to 104d associated with one or more other UAVs 102b to 102d of the plurality of UAVs 102. The processor 202 may determine a target location and a target orientation of each of the one or more imaging devices 104b to 104d, based on the received focal lens information, the received current location, the received current orientation, and a current location of the one or more static and/or moving objects. The processor 202 may further communicate control information to the one or more other UAVs 102b to 102d to modify the current location and the current orientation of each of the one or more imaging devices to the determined target location and the determined target orientation of each of the one or more imaging devices 104b to 104d.

In accordance with an embodiment of the disclosure, the server 106 may be communicatively coupled with the plurality of UAVs 102 for image processing. The plurality of UAVs 102 may be associated with the plurality of imaging devices 104 configured to capture a plurality of images. The server 106 may comprise one or more circuits, such as the processor 302, configured to receive, from the plurality of imaging devices 104 associated with the plurality of UAVs 102, focal lens information, current location and current orientation of the plurality of imaging devices 104. The processor 302 may further determine a target location and a target orientation of the plurality of imaging devices 104, based on the received focal lens information, the received current location, the received current orientation and a current location of one or more static and/or moving objects to be captured. The processor 302 may further communicate control information to the plurality of UAVs 102 to modify the current location and the current orientation of the plurality of imaging devices 104 to the determined target location and the determined target orientation of the plurality of imaging devices 104.

In accordance with an embodiment of the disclosure, a system for image processing comprises the first network, such as the first cluster 402, that may comprise a first set of UAVs. The system may further comprise a second network, such as the second cluster 404, that may comprise a second set of UAVs. Each of the first set of UAVs and the second set of UAVs may be associated with an imaging device configured to capture a plurality of images. The first UAV 102a of the first set of UAVs may comprise the first imaging device 104a configured to capture a first set of images of one or more static and/or moving objects. The first UAV 102a may further include one or more circuits, such as the processor 202, configured to receive focal lens information, current location and current orientation from a first set of imaging devices associated with the first set of UAVs. The processor 202 may further determine a target location and a target orientation of the first set of imaging devices, based on the received focal lens information, the received current location, the received current orientation and a current location of the one or more static and/or moving objects. The processor 202 may be further configured to communicate control information to the first set of UAVs to modify the current location and the current orientation of the first set of imaging devices to the determined target location and the determined target orientation of the first set of imaging devices.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A system, comprising:
   a plurality of imaging devices; and
   a network comprising a plurality of unmanned aerial vehicles (UAVs), wherein
      each of said plurality of UAVs is associated with an imaging device of said plurality of imaging devices,
      said imaging device is configured to capture a plurality of images, and
      a first UAV of said plurality of UAVs comprises:
         a first imaging device of said plurality of imaging devices, wherein said first imaging device is configured to capture a first set of images of at least one of at least one static object or at least one moving object; and
         at least one circuit configured to:
            receive, from at least one imaging device of said plurality of imaging devices, focal lens information, a current location and a current orientation of said at least one imaging device,
wherein said at least one imaging device is associated with at least one second UAV of said plurality of UAVs, and said at least one second UAV is different from said first UAV;
determine a target location and a target orientation of said at least one imaging device based on said received focal lens information, said received current location, said received current orientation, and a current location of said at least one of said at least one static object or said at least one moving object;
determine calibration information based on said received focal lens information and at least one image of a specific calibration object;
communicate control information and said calibration information to said at least one second UAV;
modify said current location and said current orientation of said at least one imaging device to said determined target location and said determined target orientation based on said communicated control information; and
enable calibration of said at least one imaging device of said at least one second UAV based on said communicated calibration information.

2. The system according to claim 1, wherein
said communicated control information further comprises capture information,
said at least one imaging device is configured to capture, based on said capture information, a second set of images of said at least one of said at least one static object or said at least one moving object, and
said second set of images is captured at said determined target location and said determined target orientation.

3. The system according to claim 2, wherein said at least one circuit is further configured to reconstruct a three dimensional (3D) structure from said captured first set of images and said captured second set of images.

4. The system according to claim 3, wherein said at least one circuit is further configured to dynamically synchronize said captured first set of images and said captured second set of images to reconstruct said 3D structure.

5. The system according to claim 1, wherein
said at least one imaging device is configured to capture said at least one image of said specific calibration object.

6. The system according to claim 1, wherein said at least one circuit is further configured to adjust at least one of intrinsic parameters or extrinsic parameters of said at least one imaging device based on said calibration.

7. A server, comprising:
at least one circuit configured to:
receive, from a plurality of imaging devices, focal lens information, a current location and a current orientation of said plurality of imaging devices, wherein said plurality of imaging devices are associated with a plurality of unmanned aerial vehicles (UAVs), said plurality of imaging devices capture a plurality of images, and
said plurality of UAVs are communicatively coupled with said server;
determine a target location and a target orientation of said plurality of imaging devices based on said received focal lens information, said received current location, said received current orientation and a current location of at least one of at least one static object or at least one moving object;
determine calibration information based on said received focal lens information and at least one image of a specific calibration object;
communicate control information and said calibration information to said plurality of UAVs;
modify said current location and said current orientation of said plurality of imaging devices to said determined target location and said determined target orientation of said plurality of imaging devices based on said communicated control information; and
enable calibration of said plurality of imaging devices based on said communicated calibration information.

8. The server according to claim 7, wherein
said communicated control information further comprises capture information,
and a set of images of said at least one of said at least one static object or said at least one moving object is captured by said plurality of imaging devices based on said capture information, and
said set of images is captured at said determined target location and said determined target orientation.

9. The server according to claim 8, wherein said at least one circuit is further configured to reconstruct a three dimensional (3D) structure from said captured set of images.

10. The server according to claim 9, wherein said at least one circuit is further configured to dynamically synchronize said captured set of images to reconstruct said 3D structure.

11. The server according to claim 7,
wherein said at least one image of said specific calibration object is captured by said plurality of imaging devices.

12. A system, comprising:
a plurality of imaging devices; and
a first network comprising a first set of unmanned aerial vehicles (UAVs) and a second network comprising a second set of UAVs, wherein
each of said first set of UAVs and said second set of UAVs is associated with an imaging device of said plurality of imaging devices,
said imaging device is configured to capture a plurality of images, and
a first UAV of said first set of UAVs comprises:
a first imaging device of said plurality of imaging devices, wherein said first imaging device is configured to capture a first set of images of at least one of at least one static object or at least one moving object; and
at least one first circuit configured to:
receive, from a first set of imaging devices of said plurality of imaging devices, focal lens information, a current location and a current orientation of said first set of imaging devices,
said first set of imaging devices are associated with said first set of UAVs;
determine a target location and a target orientation of said first set of imaging devices based on said received focal lens information, said received current location, said received current orientation and a current location of said at least one of said at least one static object or said at least one moving object;
determine calibration information based on said received focal lens information and at least one image of a specific calibration object;

communicate control information and said calibration information to said first set of UAVs;
modify said current location and said current orientation of said first set of imaging devices to said determined target location and said determined target orientation of said first set of imaging devices based on said communicated control information; and
enable calibration of said at least one imaging device of said first set of UAVs based on said communicated calibration information.

13. The system according to claim 12, wherein a second UAV of said second set of UAVs comprises:
a second imaging device of said plurality of imaging devices, said second imaging device is configured to capture a second set of images of said at least one of said at least one static object or said at least one moving object; and
at least one second circuit configured to:
receive, from a second set of imaging devices, focal lens information, a current location and a current orientation of said second set of imaging devices,
wherein said second set of imaging devices are associated with said second set of UAVs, and said second set of UAVs is different from said first set of UAVs;
determine a target location and a target orientation of said second set of imaging devices based on said received focal lens information, said received current location, and said received current orientation of said second set of imaging devices and said current location of said at least one of said at least one static object or said at least one moving object;
communicate control information to said second set of UAVs; and
modify said current location and said current orientation of said second set of imaging devices to said determined target location and said determined target orientation of said second set of imaging devices based on said communicated control information.

14. The system according to claim 13, wherein said control information communicated by said first UAV further comprises capture information,
and said first set of imaging devices is configured to capture said first set of images of said at least one of said at least one static object or said at least one moving object based on said capture information, and
said first set of images is captured at said determined target location and said determined target orientation.

15. The system according to claim 14, wherein said control information communicated by said second UAV further comprises capture information, and
said second set of imaging devices is configured to capture a second set of images of said at least one of said at least one static object or said at least one moving object based on said capture information, and
said second set of images is captured at said determined target location and said determined target orientation.

16. The system according to claim 15, wherein said at least one first circuit in said first UAV is further configured to dynamically synchronize said captured first set of images and said captured second set of images to reconstruct a three dimensional (3D) structure.

17. A method, comprising:
in a network comprising a plurality of unmanned aerial vehicles (UAVs),
wherein each of said plurality of UAVs is associated with an imaging device of a plurality of imaging devices,
said imaging device is configured to capture a plurality of images:
capturing a first set of images of at least one of at least one static object or at least one moving object, wherein said first set of images is captured by a first imaging device of said plurality of imaging devices, said first imaging device is associated with a first UAV of said plurality of UAVs;
receiving, by said first UAV, focal lens information, a current location and a current orientation of at least one imaging device, of said plurality of imaging devices, from said at least one imaging device,
wherein said at least one imaging device is associated with at least one second UAV of said plurality of UAVs, and said at least one second UAV is different from said first UAV;
determining, by said first UAV, a target location and a target orientation of said at least one imaging device based on said received focal lens information, said received current location, said received current orientation and a current location of said at least one of said at least one static object or said at least one moving object;
determining, by said first UAV, calibration information based on said received focal lens information and at least one image of a specific calibration object;
communicating, by said first UAV, control information and said calibration information to said at least one second UAV;
modifying said current location and said current orientation of said at least one imaging device to said determined target location and said determined target orientation of said at least one imaging device based on said communicated control information; and
enabling calibration of said at least one imaging device based on said calibration information.

18. The method according to claim 17, wherein said communicated control information further comprises capture information,
said method further comprising capturing, by said at least one imaging device, a second set of images of said at least one of said at least one static object or said at least one moving object based on said capture information, and
said second set of images is captured at said determined target location and said determined target orientation.

19. The method according to claim 18, further comprising reconstructing a three dimensional (3D) structure from said captured first set of images and said captured second set of images.

20. The method according to claim 19, further comprising dynamically synchronizing said captured first set of images and said captured second set of images to reconstruct said 3D structure.

21. The method according to claim 17, further comprising:
capturing, by said at least one imaging device, said at least one image of said specific calibration object.

22. The method according to claim 17, further comprising adjusting at least one of intrinsic parameters or extrinsic parameters of said at least one imaging device based on said calibration.

23. A method, comprising:
in a server communicatively coupled with a plurality of unmanned aerial vehicles (UAVs), wherein said plurality of UAVs is associated with a plurality of imaging devices that are configured to capture a plurality of images:
receiving, by said server, focal lens information, a current location and a current orientation of said plurality of imaging devices from said plurality of imaging devices, wherein said plurality of imaging devices are associated with said plurality of UAVs;
determining, by said server, a target location and a target orientation of said plurality of imaging devices based on said received focal lens information, said received current location, said received current orientation and a current location of at least one of at least one static object of at least one moving object;
determining, by said server, calibration information based on said received focal lens information and at least one image of a specific calibration object;
communicating control information and said calibration information, by said server, to said plurality of UAVs;
modifying said current location and said current orientation of said plurality of imaging devices to said determined target location and said determined target orientation of said plurality of imaging devices based on said communicated control information; and
enabling calibration of said plurality of imaging devices based on said communicated calibration information.

24. The method according to claim 23, wherein said communicated control information further comprises capture information,
a set of images of said at least one of said at least one static object or said at least one moving object is captured by said plurality of imaging devices based on said capture information, and
said set of images is captured at said determined target location and said determined target orientation.

25. The method according to claim 24, further comprising reconstructing a three dimensional (3D) structure from said captured set of images.

26. The method according to claim 25, further comprising dynamically synchronizing said captured set of images to reconstruct said 3D structure.

27. The method according to claim 23,
wherein said at least one image of said specific calibration object is captured by said at least one imaging device.

28. A method, comprising:
in a first network comprising a first set of unmanned aerial vehicles (UAVs) and a second network comprising a second set of UAVs,
wherein each of said first set of UAVs and said second set of UAVs is associated with an imaging device of a plurality of imaging devices,
said imaging device is configured to capture a plurality of images:
receiving, by a first UAV of said first set of UAVs, focal lens information, a current location and a current orientation of a first set of imaging device, of said plurality of imaging devices, from a first set of imaging devices, wherein said first set of imaging devices are associated with said first set of UAVs;
determining, by said first UAV, a target location and a target orientation of said first set of imaging devices based on said received focal lens information, said received current location, said received current orientation and a current location of at least one of at least one static object or at least one moving object;
determining, by said first UAV, calibration information based on said received focal lens information and at least an image of a specific calibration object;
communicating, by said first UAV, control information and said calibration information to said first set of UAVs;
modifying said current location and said current orientation of said first set of imaging devices to said determined target location and said determined target orientation of said first set of imaging devices based on said communicated control information; and
enable calibration of said first set of imaging devices based on said communicated calibration information.

29. The method according to claim 28, further comprising:
receiving, by a second UAV of said second set of UAVs, focal lens information, a current location and a current orientation of said second set of imaging devices,
wherein each of said focal lens information, said current location, and said second current orientation is received from a second set of imaging devices, and
said second set of imaging devices are associated with said second set of UAVs, and said second set of UAVs is different from said first set of UAVs;
determining, by said second UAV, a target location and a target orientation of said second set of imaging devices based on said received focal lens information, said received current location, said received current orientation and said current location of said at least one of said at least one static object or said at least one moving object;
communicating control information, by said second UAV, to said second set of UAVs; and
modifying said current location and said current orientation of said second set of imaging devices to said determined target location and said determined target orientation of said second set of imaging devices based on said communicated control information.

30. The method according to claim 29, wherein said control information communicated by said first UAV further comprises capture information,
and said method further comprising capturing, by said first set of imaging devices, a first set of images of said at least one of said at least one static object of said at least one moving object based on said capture information, and
wherein said first set of images is captured at said determined target location and said determined target orientation.

31. The method according to claim 30, wherein said control information communicated by said second UAV further comprises capture information,
and said method further comprising capturing, by said second set of imaging devices, a second set of images of said at least one of said at least one static object or said at least one moving object based on said capture information, and
said second set of images is captured at said determined target location and said determined target orientation.

32. The method according to claim 31, further comprising dynamically synchronizing, by said first UAV, said captured first set of images and said captured second set of images to reconstruct a three dimensional (3D) structure.

* * * * *